United States Patent
Fang et al.

(10) Patent No.: US 12,537,250 B2
(45) Date of Patent: Jan. 27, 2026

(54) BATTERY CELL, METHOD AND SYSTEM FOR MANUFACTURE SAME, BATTERY, AND POWER CONSUMING DEVICE

(71) Applicant: CONTEMPORARY AMPEREX TECHNOLOGY (HONG KONG) LIMITED, Hong Kong (CN)

(72) Inventors: Kun Fang, Ningde (CN); Zhijun Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/181,545

(22) Filed: Mar. 10, 2023

(65) Prior Publication Data
US 2023/0216118 A1 Jul. 6, 2023

Related U.S. Application Data

(63) Continuation of application No. PCT/CN2021/114154, filed on Aug. 23, 2021.

(51) Int. Cl.
*H01M 50/179* (2021.01)
*H01M 50/107* (2021.01)
(Continued)

(52) U.S. Cl.
CPC ....... *H01M 50/179* (2021.01); *H01M 50/107* (2021.01); *H01M 50/474* (2021.01);
(Continued)

(58) Field of Classification Search
CPC ............. H01M 50/179; H01M 50/107; H01M 50/474; H01M 50/538; H01M 50/533; H01M 50/566
See application file for complete search history.

(56) References Cited

U.S. PATENT DOCUMENTS

2002/0110729 A1    8/2002 Hozumi et al.
2004/0128826 A1    7/2004 Nakanishi et al.
(Continued)

FOREIGN PATENT DOCUMENTS

CN    1283879 A    2/2001
CN    101978530 A    2/2011
(Continued)

OTHER PUBLICATIONS

WO 2012161302 English Translation (Year: 2012).*
(Continued)

*Primary Examiner* — Jimmy Vo
(74) *Attorney, Agent, or Firm* — K&L Gates LLP

(57) ABSTRACT

A battery cell, a method and system for manufacturing the battery cell, a battery, and a power consuming device are provided. The battery cell comprises: an electrode assembly comprising a first tab, wherein the first tab is arranged around a central axis of the electrode assembly; a housing configured to accommodate the electrode assembly, wherein the housing comprises a barrel and a cover connected to the barrel, the barrel is arranged around a periphery of the electrode assembly, the cover is provided with an electrode lead-out hole, the central axis extends in a first direction and passes through the electrode lead-out hole, the first tab comprises a first annular portion, and a projection of the first annular portion in the first direction does not overlap with a projection of the electrode lead-out hole in the first direction; and an electrode terminal comprising a columnar portion.

18 Claims, 8 Drawing Sheets

(51) Int. Cl.
  *H01M 50/474* (2021.01)
  *H01M 50/533* (2021.01)
  *H01M 50/538* (2021.01)
  *H01M 50/566* (2021.01)
(52) U.S. Cl.
  CPC ....... *H01M 50/533* (2021.01); *H01M 50/538* (2021.01); *H01M 50/566* (2021.01)

(56) References Cited

U.S. PATENT DOCUMENTS

| | | | |
|---|---|---|---|
| 2009/0087733 A1 | 4/2009 | Yoon et al. | |
| 2014/0087226 A1 | 3/2014 | Mishiro et al. | |
| 2022/0200108 A1 | 6/2022 | Kim | |
| 2024/0145783 A1 | 5/2024 | Lee et al. | |

FOREIGN PATENT DOCUMENTS

| | | | | |
|---|---|---|---|---|
| CN | 104659317 A | | 5/2015 | |
| CN | 206584968 U | | 10/2017 | |
| CN | 206619636 U | | 11/2017 | |
| CN | 208111590 U | | 11/2018 | |
| CN | 208862040 U | | 5/2019 | |
| CN | 209183657 U | | 7/2019 | |
| CN | 209200018 U | | 8/2019 | |
| CN | 209472008 U | | 10/2019 | |
| CN | 111430588 A | | 7/2020 | |
| CN | 112072058 A | * | 12/2020 | ........ H01M 10/0422 |
| CN | 112151732 A | | 12/2020 | |
| CN | 112510326 A | | 3/2021 | |
| CN | 112751020 A | | 5/2021 | |
| CN | 112909445 A | | 6/2021 | |
| CN | 213401445 U | | 6/2021 | |
| CN | 213905545 U | | 8/2021 | |
| CN | 215988974 U | | 3/2022 | |
| CN | 215989125 U | | 3/2022 | |
| JP | H11339769 A | | 12/1999 | |
| JP | 2000200597 A | | 7/2000 | |
| JP | 2000331656 A | | 11/2000 | |
| JP | 2001256954 A | | 9/2001 | |
| JP | 2003187859 A | | 7/2003 | |
| JP | 2003272600 A | | 9/2003 | |
| JP | 2004362956 A | | 12/2004 | |
| JP | 2007265846 A | | 10/2007 | |
| JP | 2012043714 A | | 3/2012 | |
| JP | 2023529119 A | | 7/2023 | |
| KR | 20160085601 A | | 7/2016 | |
| KR | 20160120996 A | | 10/2016 | |
| WO | WO-2012161302 A1 | * | 11/2012 | ........ H01M 10/0422 |
| WO | 2020111275 A1 | | 6/2020 | |

OTHER PUBLICATIONS

CN 112072058 English Translation (Year: 2020).*
International Search Report received in the corresponding International Application PCT/CN2021/114154, mailed May 27, 2022.
Notice of Reasons for Refusal received in the corresponding International Application 2022-567353, mailed Dec. 11, 2023.
The extended European search report received in the counterpart European Application 21939589.4, mailed on July 9, 2024.
The Written Decision on Registration received in the counterpart Korean Application 10-2022-7038597, mailed on Nov. 18, 2024.
The Request for the Submission of an Opinion received in the counterpart Korean Application 10-2022-7038597, mailed on Sep. 10, 2024.
The Grant Notice received in the counterpart CN application 202180081099.0, mailed on Jul. 25, 2025, 6 pages with English translation.
The extended European search report received in the counterpart EP application 21939994.6, mailed on Aug. 8, 2023, 9 pages.
The international search report received in the counterpart PCT application PCT/CN2021/114156, mailed on Mar. 31, 2022, 4 pages with English translation.
The Notice of Reasons for Refusal received in the counterpart JP application 2024-102206, mailed on May 20, 2025, 5 pages with English translation.
The Non-Final Office Action received in the counterpart U.S. Appl. No. 18/343,767, mailed on Sep. 10, 2024, 35 pages.
The First Office Action received in the counterpart EP application 21939994.6, mailed on Mar. 6, 2025, 5 pages.
Office Action (with English Machine Translation), mailed Nov. 3, 2025, for corresponding Chinese Patent Application Serial No. 202180081084.4.

* cited by examiner

BATTERY CELL, METHOD AND SYSTEM FOR MANUFACTURE SAME, BATTERY, AND POWER CONSUMING DEVICE

CROSS-REFERENCE TO RELATED APPLICATIONS

This application is a continuation of International Application PCT/CN2021/114154, filed Aug. 23, 2021 and entitled "BATTERY CELL, METHOD AND SYSTEM FOR MANUFACTURE SAME, BATTERY, AND POWER CONSUMING DEVICE", which is incorporated herein by reference in its entirety.

TECHNICAL FIELD

The present application relates to the technical field of batteries, and in particular, to a battery cell, a method and system for manufacturing same, a battery, and a power consuming device.

BACKGROUND ART

Battery cells are widely used in electronic devices, such as a mobile phone, a notebook computer, an electromobile, an electric vehicle, an electric airplane, an electric ship, an electric toy car, an electric toy ship, an electric toy airplane, and an electric tool. The battery cells may comprise a nickel-cadmium battery cell, a nickel-hydrogen battery cell, a lithium-ion battery cell, a secondary alkaline zinc-manganese battery cell, etc.

In development of battery technology, how to improve an overcurrent capability of battery cells is an urgent technical problem to be solved in the battery technology.

SUMMARY OF THE INVENTION

The present application provides a battery cell, a method and system for manufacturing the battery cell, a battery, and a power consuming device, in which the overcurrent capability of the battery cell can be improved.

According to a first aspect, an embodiment of the present application provides a battery cell, comprising:

an electrode assembly comprising a first tab, wherein the first tab is arranged around a central axis of the electrode assembly;

a housing configured to accommodate the electrode assembly, wherein the housing comprises a barrel and a cover connected to the barrel, the barrel is arranged around a periphery of the electrode assembly, the cover is provided with an electrode lead-out hole, the central axis extends in a first direction and passes through the electrode lead-out hole, the first tab comprises a first annular portion, the first annular portion is arranged opposite to the cover, and a projection of the first annular portion in the first direction does not overlap with a projection of the electrode lead-out hole in the first direction;

an electrode terminal comprising a columnar portion and a first connecting portion connected to the columnar portion, wherein the columnar portion is at least partially located in the electrode lead-out hole, and the first connecting portion is at least partially located between the cover and the first annular portion and is configured to connect the first annular portion in such a way that the first tab is electrically connected to the electrode terminal.

In the foregoing solution, the first connecting portion extending between the cover and the first annular portion is used to connect the first annular portion of the first tab such that currents in the electrode assembly can flow to the electrode terminal through the first annular portion, thereby shortening a conductive path, reducing the internal resistance, and improving the overcurrent capability and charging efficiency of the battery cell.

In some embodiments, the first connecting portion is an annular structure surrounding the outside of the columnar portion, and the first connecting portion is at least partially welded to the first annular portion to form a first welded portion.

In the foregoing solution, the first welded portion may reduce contact resistance between the electrode terminal and the first annular portion and improve the overcurrent capability.

In some embodiments, the first welded portion is annular and is arranged around the columnar portion.

In the foregoing solution, the annular first welded portion has a relatively large overcurrent area, and can improve the uniformity of the current density of the first electrode plate, reduce the internal resistance, and improve the overcurrent capability.

In some embodiments, a plurality of first welded portions are provided, and the plurality of first welded portions are spaced in a circumferential direction of the columnar portion.

In the foregoing solution, the plurality of first welded portions can increase the overcurrent area, improve the uniformity of the current density of the first electrode plate, reduce the internal resistance, and improve the overcurrent capability.

In some embodiments, the first connecting portion comprises: a first abutting portion abutting against and welded to the first annular portion to form a first welded portion, wherein a gap for avoiding the first welded portion is formed between the first abutting portion and the cover; and a second abutting portion configured to connect the first abutting portion to the columnar portion and abutting against the cover.

In the foregoing solution, with a gap between the first abutting portion and the cover formed, the first welded portion is allowed to avoid the cover, thereby reducing the risk of the cover being crushed and improving the safety performance.

In some embodiments, a surface of the first abutting portion facing the cover is farther away from the cover than a surface of the second abutting portion facing the cover, so as to form a gap for avoiding the first welded portion.

In some embodiments, a surface of the first abutting portion facing the electrode assembly is provided with a bump, and the bump abuts against the first annular portion. The first abutting portion is formed with a groove in a region corresponding to the bump on a surface facing away from the electrode assembly, and a portion between a top end face of the bump and a bottom surface of the groove is configured to be welded to the first annular portion to form the first welded portion.

In the foregoing solution, the bump can be better attached to the first annular portion, reducing the risk of poor welding. The groove can reduce the thickness of the portion between the top end face of the bump and the bottom surface of the groove to reduce the power required for welding, reduce heat generation, and reduce the risk of the electrode assembly being burned.

In some embodiments, a surface of the second abutting portion facing the electrode assembly abuts against the first annular portion.

In the foregoing solution, part of the currents can be transmitted through a mating portion between a second inner surface and an end face of the first annular portion, thereby improving the overcurrent capability.

In some embodiments, the first abutting portion surrounds the outside of the second abutting portion, and the first abutting portion has a thickness less than that of the second abutting portion.

In the foregoing solution, the second abutting portion is configured to abut against the cover, and requires a relatively large thickness, so as to reduce deformation of the second abutting portion during assembly. The first abutting portion is configured to be welded to the first annular portion, and may have a relatively small thickness, which can reduce the power required for welding, reduce heat generation, and reduce the risk of the electrode assembly being burned.

In some embodiments, the columnar portion and the first connecting portion are of an integrally formed structure.

In the foregoing solution, a procedure for connecting the columnar portion to the first connecting portion may be omitted, the structure of the electrode terminal may be simplified, the resistance of the electrode terminal may be reduced, and the overcurrent capability may be improved.

In some embodiments, the first tab further comprises a second annular portion, the first annular portion surrounds the outside of the second annular portion, the second annular portion is arranged opposite to the electrode lead-out hole in the first direction, and the second annular portion at least partially abuts against the columnar portion.

In the foregoing solution, the provision of the second annular portion can improve the overcurrent capability. The second annular portion can also support the first annular portion in the radial direction to reduce the risk of crushing deformation of the first annular portion and improve the stability of welding of the first annular portion and the first connecting portion when the first annular portion is welded to the first connecting portion.

In some embodiments, the columnar portion is welded to the second annular portion to form a second welded portion.

In the foregoing solution, the second welded portion may reduce contact resistance between the columnar portion and the second annular portion and improve the overcurrent capability.

In some embodiments, a surface of the columnar portion facing the electrode assembly is flush with a surface of the first connecting portion facing the electrode assembly.

In the foregoing solution, both the surface of the columnar portion facing the electrode assembly and the surface of the first connecting portion facing the electrode assembly can abut against the first tab, so as to increase a contact area between the first tab and the electrode terminal and improve the overcurrent capability.

In some embodiments, the central axis coincides with an axis of the electrode lead-out hole.

In the foregoing solution, the electrode lead-out hole is substantially provided in the middle of the cover, and correspondingly, the electrode terminal is also installed on the middle of the cover. When a plurality of battery cells are assembled into sets, a requirement for positioning precision of the electrode terminal can be reduced, which simplifies an assembly process.

In some embodiments, the electrode terminal further comprises a limiting portion which is connected to and which protrudes from a lateral wall of the columnar portion, the limiting portion is located on a side of the cover which faces away from the first connecting portion, and the first connecting portion and the limiting portion are configured to clamp a part of the cover in the first direction. The first connecting portion and the limiting portion clamp a part of the cover from two sides to fix the electrode terminal to the cover.

In some embodiments, the battery cell further comprises a first insulating member and a second insulating member, the first insulating member is at least partially clamped between the limiting portion and the cover, and the second insulating member is at least partially clamped between the first connecting portion and the cover. The first insulating member and the second insulating member are configured to insulate and isolate the electrode terminal from the cover.

In some embodiments, the first insulating member and the second insulating member are of an integrally formed structure; or the first insulating member and the second insulating member are provided separately and abut against each other.

In some embodiments, one of the first insulating member and the second insulating member is configured to seal the electrode lead-out hole.

In some embodiments, a periphery of the limiting portion is provided with a plurality of protruding structures, and the plurality of protruding structures are spaced in a circumferential direction of the columnar portion.

In the foregoing solution, groove structures are provided between adjacent protruding structures. In this solution, the provision of the groove structures and the protruding structures reduces the difficulty in folding over the first limiting portion and reduces stress concentration on the first limiting portion.

In some embodiments, the limiting portion has an edge-folded structure formed by outwardly folding over an end portion of the columnar portion which faces away from the electrode assembly.

In some embodiments, the columnar portion is provided with a first through hole, and the first through hole communicates an interior space of the housing with a space outside the housing. The electrode terminal further comprises a sealing plate, and the sealing plate is connected to the columnar portion and is configured to seal the first through hole.

In the foregoing solution, the first through hole may be used in a plurality of forming procedures. For example, the first through hole may be used in a liquid injection procedure, a formation procedure or other procedures. After the battery cell is formed, the sealing plate may reduce the risk of electrolyte leakage through the first through hole, and improve the sealing performance.

In some embodiments, the first through hole is used to inject an electrolyte into the interior space of the housing.

In some embodiments, the columnar portion is provided with a first recess, and the first recess is recessed, in a direction facing the electrode assembly, from a surface of the columnar portion which faces away from the electrode assembly. The columnar portion forms a second connecting portion at the bottom of the first recess, and the first through hole runs through the second connecting portion to communicate the first recess with the interior space of the case. The sealing plate is at least partially accommodated in the first recess and closes an opening of the first recess.

In the foregoing solution, the sealing plate is at least partially accommodated in the first recess, which can reduce an overall size of the electrode terminal in the first direction, reduce a space occupied by the electrode terminal, and increase energy density. When the sealing plate is assembled, the first recess can also position the sealing plate, thereby simplifying an assembly process.

In some embodiments, the first tab further comprises a second annular portion, the first annular portion surrounds the outside of the second annular portion, the second annular portion is arranged opposite to the electrode lead-out hole in the first direction, and the second annular portion at least partially abuts against the second connecting portion. The second connecting portion is welded to the second annular portion to form a second welded portion.

In the foregoing solution, the second welded portion can reduce contact resistance between the second connecting portion and the second annular portion and improve the overcurrent capability. In this solution, the provision of the first recess reduces the thickness of the second connecting portion, which can reduce the welding power required for welding the second connecting portion to the second annular portion, reduce heat generation, and reduce the risk of other members being burned.

In some embodiments, the second connecting portion comprises a second recess, a bottom wall of the second recess is formed with the second welded portion, and the second recess is configured to be recessed from an outer surface of the second connecting portion in a direction toward the electrode assembly, such that a gap is formed between the outer surface of the second connecting portion and the bottom wall of the second recess.

During producing the battery cell, an external device needs to cooperate with the second connecting portion. Since a surface of the second welded portion is uneven, if the external device presses against the second welded portion, the external device is prone to being crushed by the second welded portion. In this embodiment, the second recess is provided to form the gap between the outer surface of the second connecting portion and the bottom wall of the second recess. In this way, the outer surface of the second connecting portion may be used to support the external device, so as to separate the external device from the second welded portion, and to reduce the risk of the external device being crushed.

In some embodiments, a gap for avoiding the second welded portion is provided between the sealing plate and the second connecting portion.

In the foregoing solution, the gap is provided between the sealing plate and the second connecting portion to enable the sealing plate to avoid the second welded portion and prevent the sealing plate from being in direct contact with the second welded portion, thereby reducing wobbles of the sealing plate during assembly and ensuring the sealing effect.

In some embodiments, a stepped surface is provided on a side wall of the first recess, and the stepped surface is used to support the sealing plate.

In the foregoing solution, when the sealing plate is assembled, the stepped surface can support the sealing plate and position the sealing plate, thereby simplifying an assembly process. The first recess has a stepped structure, such that the sealing plate abuts against the stepped surface to form a gap between the sealing plate and the second connecting portion.

In some embodiments, the sealing plate is configured to be welded to a busbar component of a battery to form a third welded portion.

In the foregoing solution, the third welded portion can reduce contact resistance between the sealing plate and the busbar component and improve the overcurrent capability.

In some embodiments, the sealing plate at least partially protrudes from the outer surface of the columnar portion.

In the foregoing solution, the sealing plate at least partially protrudes from the outer surface of the columnar portion to prevent the outer surface of the columnar portion from interfering with the attachment between the sealing plate and the busbar component and to ensure that the busbar component is closely connected to the sealing plate.

In some embodiments, the electrode assembly is of a wound structure, the electrode assembly is provided with a second through hole at a winding center, the second through hole runs through the electrode assembly in the first direction, and the second through hole is arranged opposite to the first through hole in the first direction such that the electrolyte is capable of flowing to the interior of the electrode assembly through the second through hole. In the liquid injection procedure, the electrolyte can flow into the second through hole through the first through hole, and the electrolyte flowing into the second through hole can infiltrate the electrode assembly from the inside, thereby improving the efficiency of infiltrating the electrode assembly.

In some embodiments, a projection of the first through hole in the first direction is located within a projection of the second through hole in the first direction. In this way, the blocking of the first through hole by the first tab can be reduced, and the electrolyte can smoothly flow into the second through hole.

In some embodiments, the cover and the barrel are of an integrally formed structure. This allows procedures for connecting the cover to the barrel to be omitted. The housing may be formed by a drawing process.

In some embodiments, the electrode assembly further comprises a second tab which is arranged around the central axis of the electrode assembly. The first tab and the second tab are respectively arranged at two ends of the electrode assembly in the first direction. The barrel is configured to connect the second tab to the cover in such a way that the second tab is electrically connected to the cover.

In the foregoing solution, the cover and the electrode terminal have different polarities. In this case, one of the cover and the electrode terminal may be act as a positive output electrode of the battery cell, and the other may act as a negative output electrode of the battery cell. In this embodiment, the positive output electrode and the negative output electrode are arranged on the same side of the battery cell, which can simplify a process of connecting the plurality of battery cells.

In some embodiments, the second tab is a negative tab, and a bulk material of the housing is steel. The housing is electrically connected to the negative tab, i.e., the housing is in a low potential state. The housing of steel is not prone to corrosion by the electrolyte in the low potential state.

In some embodiments, the barrel has an opening at an end facing away from the cover, and the battery cell further comprises a cover plate for closing the opening.

According to a second aspect, an embodiment of the present application provides a battery, comprising a plurality of battery cells according to any one of the embodiments of the first aspect and busbar components, wherein the busbar components are configured to electrically connect at least two of the battery cells.

According to a third aspect, an embodiment of the present application provides a power consuming device, comprising a battery according to the second aspect, wherein the battery is configured to provide electric energy.

According to a fourth aspect, an embodiment of the present application provides a method for manufacturing a battery cell, comprising:

providing an electrode assembly, wherein the electrode assembly comprises a first tab, the first tab is arranged around a central axis of the electrode assembly, and the first tab comprises a first annular portion;

providing an electrode terminal comprising a columnar portion and a first connecting portion connected to the columnar portion;

connecting at least a part of the first connecting portion to the first annular portion in such a way that the first tab is electrically connected to the electrode terminal;

providing a housing, wherein the housing comprises a barrel and a cover connected to the barrel, the barrel has an opening at an end facing away from the cover, and the cover is provided with an electrode lead-out hole;

installing the electrode assembly and the electrode terminal into the housing, and making the columnar portion to extend outside the cover through the electrode lead-out hole; and providing a cover plate and connecting the cover plate to the barrel to close the opening of the barrel;

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the first connecting portion is at least partially located between the cover and the first annular portion and is connected to the first annular portion.

In some embodiments, the method for manufacturing a battery cell further comprises: squeezing an end portion of the columnar portion which faces away from the electrode assembly to force the end portion to extend outwardly to form a limiting structure for fixing the electrode terminal to the cover. The limiting structure and the first connecting portion can clamp a part of the cover from two sides to fix the electrode terminal to the cover.

In some other embodiments, the method for manufacturing a battery cell further comprises: the end portion of the columnar portion which faces away from the electrode assembly is outwardly folding over to form an edge-folded structure, so as to fix the electrode terminal to the cover. The edge-folded structure and the first connecting portion can clamp a part of the cover from two sides to fix the electrode terminal to the cover.

According to a fifth aspect, an embodiment of the present application provides a system for manufacturing a battery cell, comprising:

a first provision means configured to provide an electrode assembly, wherein the electrode assembly comprises a first tab, the first tab is arranged around a central axis of the electrode assembly, and the first tab comprises a first annular portion;

a second provision means configured to provide an electrode terminal comprising a columnar portion and a first connecting portion connected to the columnar portion;

a first assembly means configured to connect at least a part of the first connecting portion to the first annular portion in such a way that the first tab is electrically connected to the electrode terminal;

a third provision means configured to provide a housing, wherein the housing comprises a barrel and a cover connected to the barrel, the barrel has an opening at an end facing away from the cover, and the cover is provided with an electrode lead-out hole;

a second assembly means configured to install the electrode assembly and the electrode terminal into the housing and to make the columnar portion to extend outside the cover through the electrode lead-out hole; and a fourth provision means configured to provide a cover plate and connect the cover plate to the barrel to close the opening of the barrel;

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the first connecting portion is at least partially located between the cover and the first annular portion and is connected to the first annular portion.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without creative efforts.

DETAILED DESCRIPTION OF EMBODIMENTS

Figure 1:
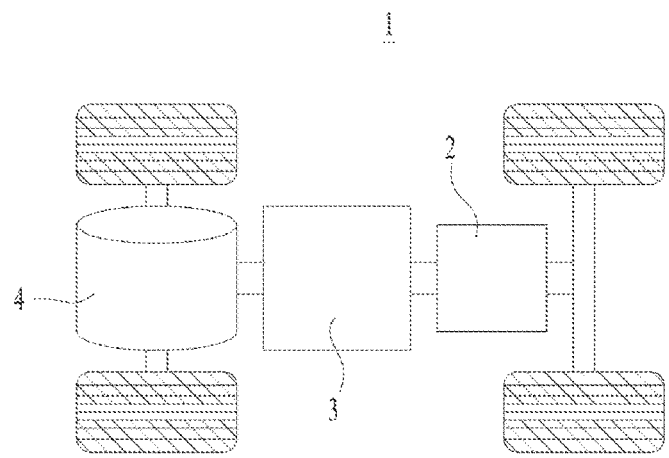
FIG. 1 is a schematic structural diagram of a vehicle provided in some embodiments of the present application.

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. All the other embodiments obtained by those of ordinary skill in the art based on the embodiments of the present application without creative efforts shall fall within the scope of protection of the present application.

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprise" and "have" and any variations thereof in the description and the claims of the present application as well as the description of the drawings described above are intended to cover non-exclusive inclusion.

The terms "first", "second", etc. in the description and the claims of the present application as well as the foregoing drawings are used to distinguish between different objects, rather than describing a specific order or a primary-secondary relationship.

In the present application, "embodiment" mentioned means that the specific features, structures and characteristics described with reference to the embodiments may be included in at least one embodiment of the present application. The phrase at various locations in the description does not necessarily refer to the same embodiment, or an independent or alternative embodiment exclusive of another embodiment.

In the description of the present application, it should be noted that, the terms "install", "connected", "connect", or "attach" should be interpreted in a broad sense unless explicitly defined and limited otherwise. For example, the terms may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application may be understood according to specific circumstances.

The term "and/or" in the present application is merely a description of the associated relationship of associated objects, representing that three relationships may exist, for example, A and/or B, may be expressed as: the three instances of A alone, A and B simultaneously, and B alone. In addition, the character "/" in the present application generally indicates that the associated objects before and after the character are in a relationship of "or".

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the drawings, as well as the dimensions, such as overall thickness, length and width, of an integrated apparatus are illustrative only and should not be construed to limit the present application in any way.

"A plurality of" appearing in the present application means two or more (including two).

In the present application, a battery cell may comprise a lithium-ion secondary battery cell, a lithium-ion primary battery cell, a lithium-sulfur battery cell, a sodium-lithium-ion battery cell, a sodium-ion battery cell, a magnesium-ion battery cell, or the like, which is not limited in the embodiments of the present application.

A battery mentioned in the embodiments of the present application refers to a single physical module comprising one or more battery cells to provide a higher voltage and capacity. For example, the battery mentioned in the present application may comprise a battery module, a battery pack, or the like. The battery generally comprises a case for packaging one or more battery cells. The case can prevent liquid or other foreign matters from affecting the charging or discharging of the battery cell.

The battery cell comprises an electrode assembly and an electrolyte, the electrode assembly comprising a positive electrode plate, a negative electrode plate, and a separator. The battery cell operates mainly by relying on movement of metal ions between the positive electrode plate and the negative electrode plate. The positive electrode plate comprises a positive current collector and a positive active material layer, wherein a surface of the positive current collector is coated with the positive active material layer. The positive current collector comprises a positive current collecting portion and a positive tab, wherein the positive current collecting portion is coated with the positive active material layer, and the positive tab is not coated with the positive active material layer. Taking a lithium-ion battery as an example, the positive current collector may be made of aluminum, the positive active material layer comprises a positive active material which may be lithium cobalt oxides, lithium iron phosphate, ternary lithium, lithium manganate, or the like. The negative electrode plate comprises a negative current collector and a negative active material layer, wherein a surface of the negative current collector is coated with the negative active material layer. The negative current collector comprises a negative current collecting portion and a negative tab, wherein the negative current collecting portion is coated with the negative active material layer, and the negative tab is not coated with the negative active material layer. The negative current collector may be made of copper, the negative active material layer comprises a negative active material which may be carbon, silicon, or the like. The separator may be made of polypropylene (PP), polyethylene (PE), or the like.

The battery cell further comprises a housing for accommodating an electrode assembly, the housing is provided with an electrode lead-out hole for installing an electrode terminal, and the electrode terminal is configured to be electrically connected to the electrode assembly for implementing the charging and discharging of the electrode assembly.

The electrode plate of the electrode assembly comprises an electricity generating portion and a tab connected to the electricity generating portion. Taking the positive electrode plate as an example, the electricity generating portion comprises a positive current collecting portion and an active material layer coated on the positive current collecting portion. Electrode assemblies generally input and output currents through the tab. In a wound electrode assembly, both the tab and the electricity generating portion are of a multi-turn structure. With the increase in the number of turns from inside to outside, a perimeter of each turn of the electricity generating portion and the tab gradually increases, and correspondingly, internal resistance of each turn also gradually increases.

The housing comprises a cover opposite to the tab, and the electrode lead-out hole is provided in the cover. The electrode lead-out hole is usually provided in the middle of the cover, and correspondingly, the electrode terminal is also installed on the middle of the cover.

The inventors have noticed that due to the limitation by the position of the electrode lead-out hole, the electrode terminal is generally connected to an inner turn region of the tab for implementing an electrical connection between the electrode terminal and the tab, which resulting in a long conductive path between the outer turn region of the electricity generating portion and the electrode terminal and an excessively large internal resistance, thereby affecting the overcurrent capability and charging efficiency of the battery cell.

In view of this, an embodiment of the present application provides a technical solution in which a part of the electrode terminal extends between the cover and the first annular portion and is connected to the tab, and thus the electrode terminal is connected to a part of the tab which is close to the outside relative to the electrode lead-out hole, so as to shorten the conductive path between the tab and the electrode terminal, reduce the internal resistance, and improves the overcurrent capability.

The technical solution described in the embodiment of the present application is applicable to a battery and a power consuming device using a battery.

The power consuming device may be a vehicle, a mobile phone, a portable device, a notebook computer, a ship, a spacecraft, an electric toy, an electricd tool, etc. The vehicle may be a fuel vehicle, a gas vehicle or a new-energy vehicle. The new-energy vehicle may be a battery electric vehicle, a hybrid vehicle, an extended-range vehicle, or the like. The spacecraft includes an airplane, a rocket, an aerospace plane, a spaceship, etc. The electric toy includes a stationary or mobile electric toy, such as a game machine, an electric toy car, an electric toy ship, and an electric toy airplane. The electric tool includes a metal cutting electric tool, a grinding electric tool, an assembling electric tool, and a railway electric tool, such as an electric drill, an electric grinder, an electric wrench, an electric screwdriver, an electric hammer, an electric impact drill, a concrete vibrator, and an electric planer. The foregoing power consuming devices are not specifically limited in the embodiments of the present application.

For ease of description, an example in which a power consuming device refers to a vehicle is used for description in the following embodiments.

FIG. 1 is a schematic structural diagram of a vehicle provided in some embodiments of the present application. As shown in FIG. 1, a battery 2 is provided inside the vehicle 1, and the battery 2 may be arranged at the bottom, the head or the tail of the vehicle 1. The battery 2 may be configured for power supply for the vehicle 1. For example, the battery 2 may serve as an operating power source for the vehicle 1.

The vehicle 1 may further comprise a controller 3 and a motor 4, and the controller 3 is configured to control the battery 2 to supply power to the motor 4, for example, to satisfy operating power demands during starting, navigation and traveling of the vehicle 1.

In some embodiments of the present application, the battery 2 can not only serve as an operating power source for the vehicle 1, but also serve as a driving power source for the vehicle 1, in place of or partially in place of fuel or natural gas, to provide driving power for the vehicle 1.

Figure 2:
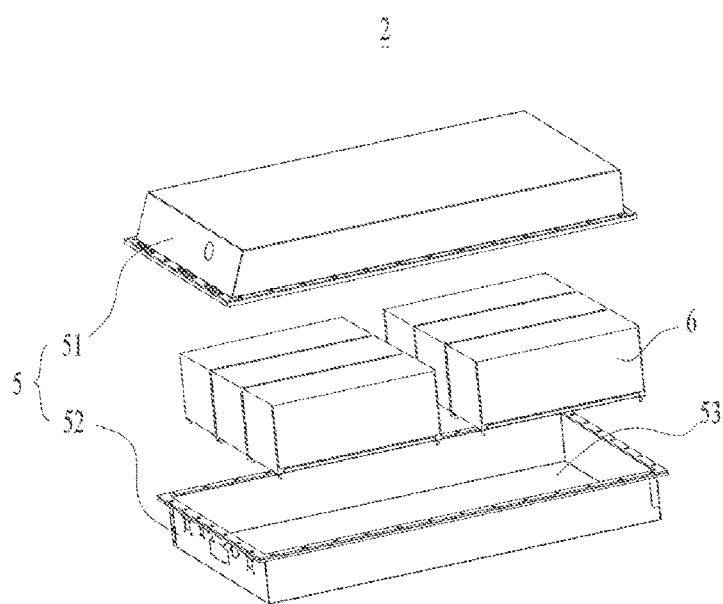
FIG. 2 is a schematic exploded view of a battery provided in some embodiments of the present application.

FIG. 2 is a schematic exploded view of a battery provided in some embodiments of the present application. As shown in FIG. 2, the battery 2 comprises a case 5 and battery cells (not shown in FIG. 2) which are accommodated in the case 5.

The case 5 is configured to accommodate the battery cells, and the case 5 may have various structures. In some embodiments, the case 5 may comprise a first case portion 51 and a second case portion 52, the first case portion 51 and the second case portion 52 cover each other, and the first case portion 51 and the second case portion 52 jointly define an accommodating space 53 for accommodating the battery cells. The second case portion 52 may be a hollow structure with an open end, the first case portion 51 has a plate-like structure, and the first case portion 51 covers an open side of the second case portion 52 to form the case 5 with the accommodating space 53. The first case portion 51 and the second case portion 52 each may also be a hollow structure with an open side, and the open side of the first case portion 51 covers the open side of the second case portion 52 to form the case 5 with the accommodating space 53. Of course, the first case portion 51 and the second case portion 52 may have various shapes such as a cylinder and a cuboid.

To improve sealing performance after the first case portion 51 and the second case portion 52 are connected to each other, a seal, such as a sealant and a seal ring, may be provided between the first case portion 51 and the second case portion 52.

Assuming that the first case portion 51 covers the top of the second case portion 52, the first case portion 51 may also be referred to as an upper case cover, and the second case portion 52 may also be referred to as a lower case.

In the battery 2, one or more battery cells may be provided. If a plurality of battery cells are provided, the plurality of battery cells may be in series connection or parallel connection or series-parallel connection. The series-parallel connection means that some of the plurality of battery cells are in series connection and some are in parallel connection. The plurality of battery cells may be directly in series connection or parallel connection or series-parallel connection, and then a whole composed of the plurality of battery cells is accommodated in the case 5. Of course, a plurality of battery cells may also be first in series connection or parallel connection or series-parallel connection to form a battery module 6, and a plurality of battery modules 6 are in series connection or parallel connection or series-parallel connection to form a whole and are accommodated in the case 5.

Figure 3:
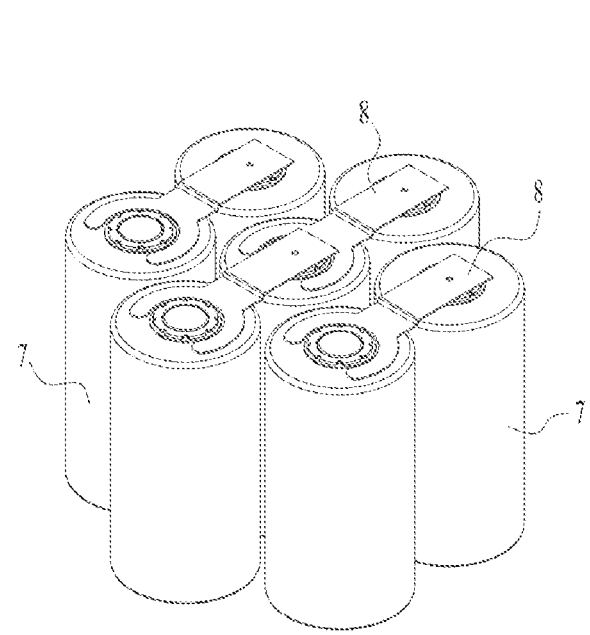
FIG. 3 is a schematic structural diagram of a battery module shown in FIG. 2.

FIG. 3 is a schematic structural diagram of the battery module shown in FIG. 2.

In some embodiments, as shown in FIG. 3, a plurality of battery cells 7 are provided, and the plurality of battery cells 7 are connected in series or in parallel or in series-parallel to form a battery module 6. A plurality of battery modules 6 are connected in series or in parallel or in series-parallel to form a whole and are accommodated in the case.

The plurality of battery cells 7 in the battery module 6 may be electrically connected to each other by means of a busbar component 8 to implement series connection or parallel connection or series-parallel connection between the plurality of battery cells 7 in the battery module 6. There may be one or more busbar components, and each busbar component 8 is configured to electrically connect at least two battery cells 7.

Figure 4:
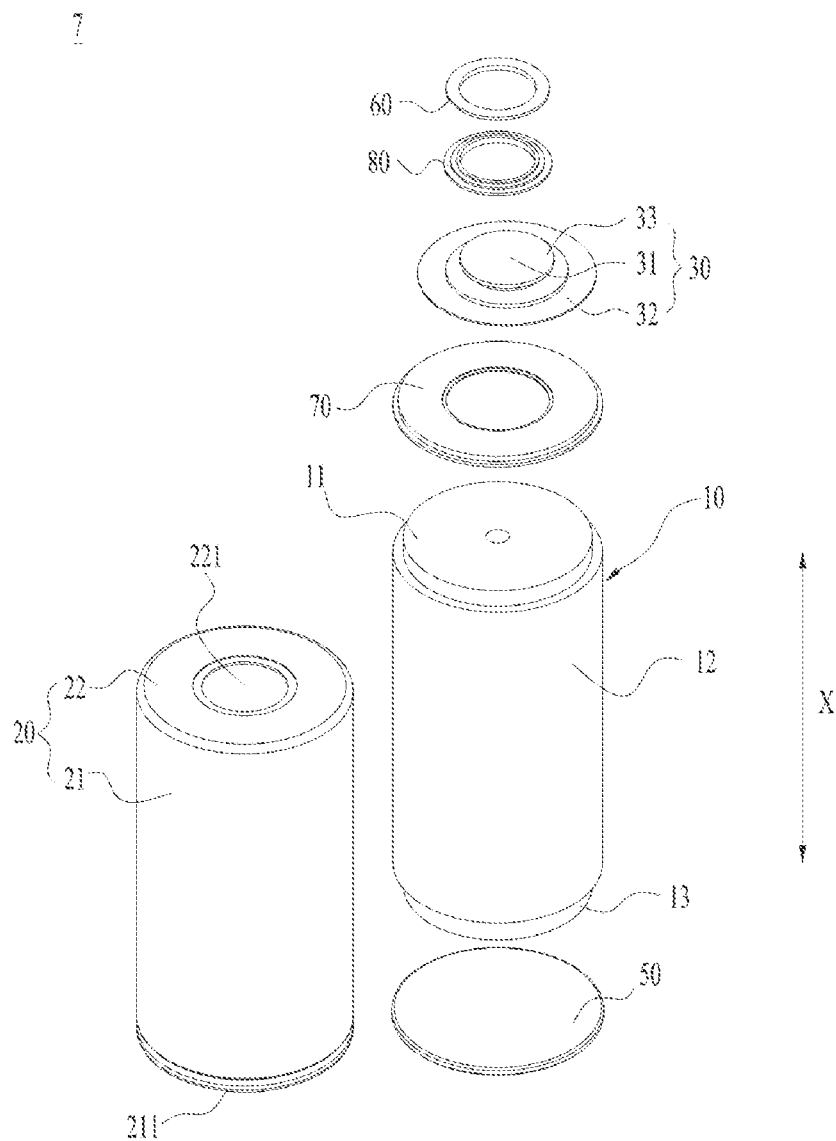
FIG. 4 is a schematic exploded view of a battery cell provided in some embodiments of the present application.
Figure 5:
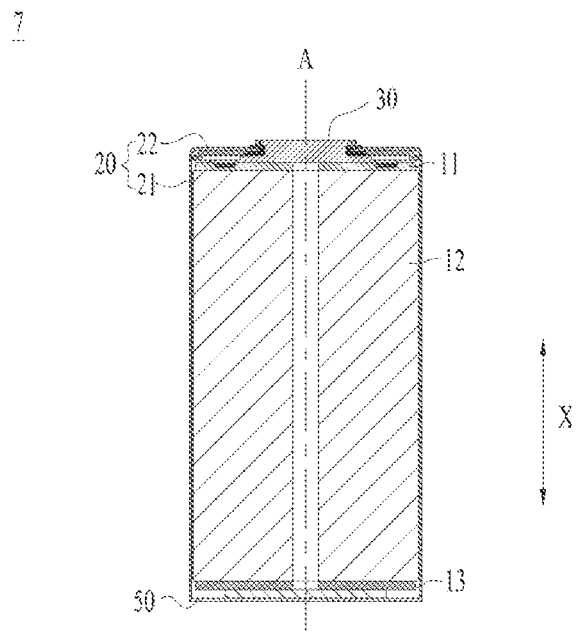
FIG. 5 is a schematic cross-sectional view of a battery cell provided in some embodiments of the present application.

FIG. 4 is a schematic exploded view of a battery cell provided in some embodiments of the present application; FIG. 5 is a schematic cross-sectional view of a battery cell provided in some embodiments of the present application; and FIG. 6 is a partial enlarged schematic diagram of the battery cell shown in FIG. 5.

Figure 6:
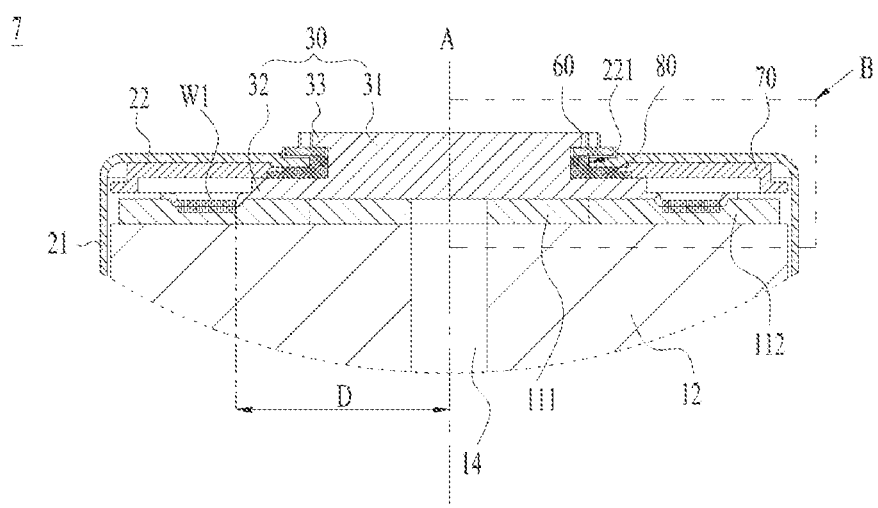
FIG. 6 is a partial enlarged schematic diagram of the battery cell shown in FIG. 5.

As shown in FIGS. 4 to 6, the battery cell 7 according to the embodiments of the present application comprises an electrode assembly 10, a housing 20, and an electrode terminal 30. The electrode assembly 10 comprises a first tab 11, and the first tab 11 is arranged around a central axis A of the electrode assembly 10. The housing 20 is configured to accommodate the electrode assembly 10, wherein the housing 20 comprises a barrel 21 and a cover 22 connected to the barrel 21, the barrel 21 is arranged around a periphery of the electrode assembly 10, the cover 22 is provided with an electrode lead-out hole 221, and the central axis A extends in a first direction X and passes through the electrode lead-out hole 221; the first tab 11 comprises a first annular portion 112, the first annular portion 112 is arranged opposite to the cover 22, and a projection of the first annular portion 112 in the first direction X does not overlap with a projection of the electrode lead-out hole 221 in the first direction X. The electrode terminal 30 comprises a columnar portion 31 and a first connecting portion 32 connected to the columnar portion 31, wherein the columnar portion 31 is at least partially located in the electrode lead-out hole 221, and the first connecting portion 32 is at least partially located between the cover 22 and the first annular portion 112 and is configured to connect the first annular portion 112 in such a way that the first tab 11 is electrically connected to the electrode terminal 30.

The electrode assembly 10 comprises a first electrode plate, a second electrode plate, and a separator, wherein the separator is configured to separate the first electrode plate from the second electrode plate. The first electrode plate and the second electrode plate have opposite polarities, in other words, one of the first electrode plate and the second electrode plate is a positive electrode plate, and the other of the first electrode plate and the second electrode plate is a negative electrode plate.

The first electrode plate, the second electrode plate and the separator each is of a strip-shaped structure, and the first electrode plate, the second electrode plate and the separator are wound around the central axis A as one piece to form a wound structure. The wound structure may be a cylindrical structure, a flat structure or a structure of another shape.

Seen from the appearance of the electrode assembly 10, the electrode assembly 10 comprises a main body portion 12, a first tab 11, and a second tab 13, and the first tab 11 and the second tab 13 protruding from the main body portion 12. The first tab 11 is a part of the first electrode plate which is not coated with an active material layer, and the second tab 13 is a part of the second electrode plate which is not coated with an active material layer.

The first tab 11 and the second tab 13 may extend from the same side of the main body portion 12, or may extend from two opposite sides respectively. For example, the first tab 11 and the second tab 13 are arranged on two sides of the main body portion 12 in the first direction X respectively, in other words, the first tab 11 and the second tab 13 are arranged at two ends of the electrode assembly 10 in the first direction X respectively. The first tab 11 is located at one end of the electrode assembly 10 facing the cover 22, and the second tab 13 is located at the other end of the electrode assembly 10 which faces away from the cover 22.

Optionally, the first tab 11 is wound around the central axis A of the electrode assembly 10 by a plurality of turns, in other words, the first tab 11 comprises a plurality of turns of tab layers. After the winding is completed, the first tab 11 is generally cylindrical, with a slit reserved between two adjacent turns of tab layers. In this embodiment of the present application, the first tab 11 can be treated to reduce the slit between the tab layers for facilitating the connection of the first tab 11 to another conductive structure. For example, in this embodiment of the present application, the first tab 11 can be flattened, such that end portion regions of the first tab 11 away from the main body portion 12 are gathered together. The flattening enables a compact end face to be formed at an end of the first tab 11 away from the main body portion 12, which reduces the slit between the tab layers and facilitates the connection of the first tab 11 to the electrode terminal 30. Alternatively, in this embodiment of the present application, a conductive material may also fill between two adjacent turns of tab layers, so as to reduce the slit between the tab layers.

Optionally, the second tab 13 is wound around the central axis A of the electrode assembly 10 by a plurality of turns, and the second tab 13 comprises a plurality of turns of tab layers. For example, the second tab 13 is also flattened to reduce a slit between tab layers of the second tab 13.

The housing 20 is of a hollow structure, and has a space for accommodating the electrode assembly 10 formed therein. The shape of the housing 20 may be determined depending on the specific shape of the electrode assembly 10. For example, if the electrode assembly 10 is of a cylindrical structure, a cylindrical housing may be selected; and if the electrode assembly 10 is of a cuboid structure, a cuboid housing may be used. Optionally, the electrode assembly 10 and the housing 20 are both cylinders; correspondingly, the barrel 21 is a cylinder, and the cover 22 has a circular plate-like structure.

The cover 22 and the barrel 21 may be of an integrally formed structure, that is, the housing 20 is an integrally formed member. Of course, the cover 22 and the barrel 21 may also be two members provided separately and then are connected together by welding, riveting, bonding, etc.

The housing 20 is of a hollow structure with an open side. Specifically, the barrel 21 has an opening 211 at an end facing away from the cover 22. The battery cell 7 further comprises a cover plate 50, and the cover plate 50 covers the opening of the barrel 21 to close the opening 211 of the barrel 21. The cover plate 50 may have various structures, for example, the cover plate 50 has a plate-like structure.

The electrode lead-out hole 221 runs through the cover 22, such that electric energy in the electrode assembly 10 can be led out of the housing 20. For example, the electrode lead-out hole 221 runs through the cover 22 in the first direction X.

The central axis A is a virtual straight line parallel to the first direction X, and passes through the electrode lead-out hole 221. The central axis A of the electrode assembly 10 and the axis of the electrode lead-out hole 221 may or may not coincide.

The electrode terminal 30 is configured to be connected to the busbar component to implement the electrical connection between the battery cells 7.

The electrode terminal 30 may be arranged on the cover 22 in an insulating manner, or may be electrically connected to the cover 22. This is not limited in the embodiments of the present application, as long as the conductivity between the first tab 11 and the second tab 13 is prevented.

The housing 20 may be positively charged, negatively charged or uncharged.

The first tab 11 may be a positive tab or a negative tab.

The first annular portion 112 is an annular structure arranged around the central axis A and is located outside the electrode lead-out hole 221 in the second direction, and a radius of each turn of tab layer in the first annular portion 112 is greater than that of the electrode lead-out hole 221. The second direction is a radial direction of the first tab 11.

In this embodiment, the cover 22 refers to a solid part, and is arranged opposite to the first annular portion 112 in the first direction X. The cover 22 covers the first annular portion 112 in the first direction X.

The first tab 11 may be entirely located outside the electrode lead-out hole 221 in the second direction, that is, the first tab 11 comprises only the first annular portion 112. Of course, a portion of the first tab 11 may also be arranged opposite to the electrode lead-out hole 221 in the first direction X, that is, the projection of the first tab 11 in the first direction X partially overlaps with the projection of the electrode lead-out hole 221 in the first direction X.

The electrode terminal 30 is installed in the electrode lead-out hole 221 and covers the electrode lead-out hole 221. The columnar portion 31 can extend outside the housing 20 through the electrode lead-out hole 221, so as to extract electric energy from the electrode assembly 10.

The electrode terminal 30 is fixed to the cover 22. The electrode terminal 30 may be fixed to the cover 22 by means of the structure of the electrode terminal itself, for example, is fixed to the cover 22 by welding, riveting or in other manners, or may be fixed to the cover 22 by other fixing members.

The first connecting portion 32 may be connected to the first annular portion 112 by welding, abutting, bonding, or the like.

The first connecting portion 32 at least partially overlaps with the first annular portion 112 in the first direction X, in order to facilitate connection of the first connecting portion 32 to the first annular portion 112.

The first connecting portion 32 protrudes from and is connected to a lateral wall of the columnar portion 31. One or more first connecting portions 32 may be provided. For example, the first connecting portion 32 may be an annular structure surrounding the outside of the columnar portion 31. Alternatively, a plurality of first connecting portions 32 may be provided, and the plurality of first connecting portions 32 may be spaced in a circumferential direction of the columnar portion 31.

The columnar portion 31 and the first connecting portion 32 may be of an integrally formed structure. Of course, the columnar portion 31 and the first connecting portions 32 may also be two members provided separately and then are connected together by welding, riveting, bonding, etc.

In the battery cell 7 according to this embodiment of the present application, the first connecting portion 32 extending between the cover 22 and the first annular portion 112 is used to connect the first annular portion 112 of the first tab 11, such that currents in the electrode assembly 10 can flow to the electrode terminal 30 through the first annular portion 112, thereby shortening the conductive path, reducing the internal resistance, and improving the overcurrent capability and charging efficiency of the battery cell 7.

An outer turn region of an electricity generating portion of the first electrode plate corresponds to the first annular portion 112, and currents in an outer turn portion can flow to the electrode terminal 30 through the first annular portion 112, thereby shortening the conductive path; and a perimeter of an inner turn region of the electricity generating portion of the first electrode plate is relatively small, such that a conductive path between the inner turn region and the first annular portion 112 is also relatively small. Therefore, in this embodiment, the conductive path can be shortened, and the internal resistance can be reduced.

In some embodiments, the central axis A coincides with an axis of the electrode lead-out hole 221.

In this embodiment, it is not required that the central axis A perfectly coincide with the axis of the electrode lead-out hole 221, and there may be a deviation allowed by a process between the two axes.

In this embodiment, the electrode lead-out hole 221 is substantially provided in the middle of the cover 22, and correspondingly, the electrode terminal 30 is also installed on the middle of the cover 22. When a plurality of battery cells 7 are assembled into sets, a requirement for positioning precision of the electrode terminal 30 can be reduced, which simplifies an assembly process.

For example, the axis of the electrode lead-out hole 221 coincides with an axis of the cover 22, and the cover 22 is of an annular structure arranged around the axis of the electrode lead-out hole 221. Optionally, the electrode lead-out hole 221 is a circular hole, and the cover 22 is an annular structure.

For example, the axis of the electrode terminal 30 coincides with the axis of the electrode lead-out hole 221.

In some embodiments, the cover 22 and the barrel 21 are of an integrally formed structure. This allows procedures for connecting the cover 22 to the barrel 21 to be omitted. The housing 20 may be formed by a drawing process.

In some embodiments, the electrode assembly 10 further comprises a second tab 13, and the second tab 13 is arranged around the central axis A of the electrode assembly 10. The first tab 11 and the second tab 13 are arranged at two ends of the electrode assembly 10 in the first direction X respectively. The barrel 21 is configured to connect the second tab 13 to the cover 22 in such a way that the second tab 13 is electrically connected to the cover 22.

The barrel 21 may be directly electrically connected to the second tab 13, or may be electrically connected to the second tab 13 by means of another member. For example, the second tab 13 is electrically connected to the barrel 21 by means of the cover plate 50.

The cover 22 and the electrode terminal 30 have different polarities. In this case, one of the cover 22 and the electrode terminal 30 may act as a positive output electrode of the battery cell 7, and the other may act as a negative output electrode of the battery cell 7. In this embodiment, the positive output electrode and the negative output electrode are arranged on the same side of the battery cell 7, which can simplify a process for connecting the plurality of battery cells 7.

The electrode lead-out hole 221 in this embodiment of the present application is formed after the housing 20 is formed by drawing.

The inventors tried to roll an open end of the barrel to fold over the open end of the cylinder inwards to form an edge-folded structure, and the edge-folded structure presses the cover plate to implement the fixing of the cover plate. The inventors installed the electrode terminal on the cover plate, and used the edge-bent structure and the electrode terminal as two output electrodes of the battery cell. However, the larger the size of the edge-bent structure, the higher the risk of curling and creases of the edge-bent structure after forming. If the edge-bent structure is curled and creased, a surface of the edge-bent structure is uneven. When the edge-bent structure is welded to an external busbar component, the problem of poor welding will occur. Therefore, the size of the edge-bent structure is relatively limited, resulting in an insufficient overcurrent capability of the battery cell.

In this embodiment, the electrode lead-out hole 221 for installing the electrode terminal 30 is formed in the cover 22 by using a trepanning process, so as to arrange the positive output electrode and the negative output electrode at an end of the battery cell 7 which faces away from the opening of the barrel 21. The cover 22 is formed during forming the housing 20, and flatness can be ensured even after the electrode lead-out hole 221 is provided, such that a connection strength between the cover 22 and the busbar component is ensured. In addition, the flatness of the cover 22 is not restricted by its own size, such that the cover 22 may have a relatively large size, so as to improve the overcurrent capability of the battery cell 7.

In some embodiments, the second tab 13 is a negative tab, and a bulk material of the housing 20 is steel.

The housing 20 is electrically connected to the negative tab, i.e., the housing 20 is in a low potential state. The housing 20 of steel is not prone to corrosion by the electrolyte in the low potential state.

In some embodiments, the columnar portion 31 and the first connecting portion 32 are of an integrally formed structure.

In this embodiment, a procedure for connecting the columnar portion 31 to the first connecting portion 32 may be omitted, the structure of the electrode terminal 30 may be simplified, the resistance of the electrode terminal 30 may be reduced, and the overcurrent capability may be improved.

In some embodiments, the first connecting portion 32 is an annular structure surrounding the outside of the columnar portion 31, and the first connecting portion 32 is at least partially welded to the first annular portion 112 to form a first welded portion W1.

In the second direction, the first welded portion W1 is located outside the electrode lead-out hole 221.

When the battery cell 7 is assembled, the first annular portion 112 of the first tab 11 of the electrode assembly 10 may be first welded to the first connecting portion 32 of the electrode terminal 30, then the electrode assembly 10 and the electrode terminal 30 are placed together into the housing 20, and the columnar portion 31 projects from the electrode lead-out hole 221.

The first welded portion W1 may be linear, C-shaped, annular, spiral, V-shaped or in another shape, which is not limited in this embodiment.

One or more first welded portions W1 may be provided.

The first welded portion W1 may reduce contact resistance between the electrode terminal 30 and the first annular portion 112 and improve the overcurrent capability.

In some embodiments, a cross section of the first tab 11 perpendicular to the first direction X is annular. The first tab 11 has an outer radius R, a minimum distance D between the first welded portion W1 and the central axis A in a second direction is provided, and R and D meet: $0.2 \leq D/R \leq 0.8$, wherein the second direction is a radial direction of the first tab 11.

Upon being flattened, the first tab 11 is generally cylindrical. The cross section of the first tab 11 perpendicular to the first direction X is not required to be absolutely annular, and a certain deviation is allowed.

The first welded portion W1 is configured to transmit currents between the electrode terminal 30 and the first tab 11, and a position of the first welded portion has a direct impact on a conductive path of each part of the first tab 11. If $D/R<0.2$, a distance between the first welded portion W1 and an outermost tab layer is excessively large, resulting in an excessively large difference between a current path between the outermost tab layer and the electrode terminal 30 and a current path between an innermost tab layer and the electrode terminal 30, which causes a nonuniform current density of the first electrode plate of the electrode assembly 10 and increases the internal resistance. If $D/R>0.8$, a distance between the first welded portion W1 and the innermost tab layer is excessively large, resulting in an excessively large difference between the current path between the outermost tab layer and the electrode terminal 30 and the current path between the innermost tab layer and the electrode terminal 30, which causes a nonuniform current density of the first electrode plate and increases the internal resistance.

In this embodiment of the present application, values of D and R are set to meet $0.2 \leq D/R \leq 0.8$, which can reduce a difference of current paths between portions of the first tab 11 at different positions and the electrode terminal 30, improve the uniformity of the current density of a first electrode plate of the electrode assembly 10, reduce the internal resistance, and improve the overcurrent capability.

Optionally, D/R is greater than or equal to 0.3 and less than or equal to 0.7. As an example, the value of D/R is 0.3, 0.4, 0.5, 0.6 or 0.7.

In some embodiments, the total number of turns of the tab layers of the first tab 11 is N1, the total number of turns of the tab layers connected to the first welded portion W1 is N2, and the two meet: $0.3 \leq N2/N1 \leq 0.7$.

The first welded portion W1 connects the N2 turns of tab layers together, such that currents between the N2 turns of tab layers can directly flow to the electrode terminal 30 through the first welded portion W1 without passing through other tab layers. If $N2/N1 \geq 0.3$, the overcurrent capability can be effectively improved, and the difference of the current paths between different portions of the first tab 11 and the electrode terminal 30 can be reduced. If $N2/N1>0.7$, in the radial direction of the first tab 11, the size of the first connecting portion 32 is excessively large while the size of the columnar portion 31 is excessively small, which will affect an overcurrent area of the electrode terminal 30.

Optionally, the value of N2/N1 may be 0.3, 0.4, 0.5, 0.6 or 0.7.

Figure 7:
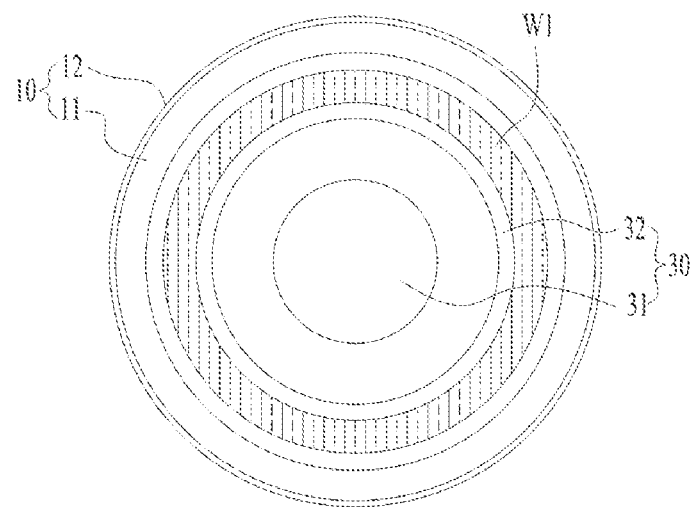
FIG. 7 is a schematic structural diagram of an electrode assembly and an electrode terminal of a battery cell in some embodiments of the present application after welding.
Figure 8:
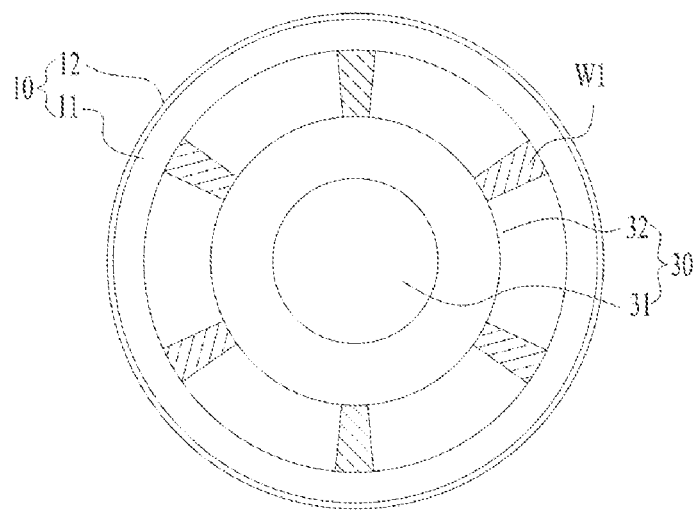
FIG. 8 is a schematic structural diagram of an electrode assembly and an electrode terminal of a battery cell in some other embodiments of the present application after welding.

FIG. 7 is a schematic structural diagram of an electrode assembly and an electrode terminal of a battery cell in some embodiments of the present application after welding; and FIG. 8 is a schematic structural diagram of an electrode assembly and an electrode terminal of a battery cell in some other embodiments of the present application after welding.

As shown in FIG. 7, in some embodiments, the first welded portion W1 is annular and is arranged around the columnar portion 31.

The annular first welded portion W1 has a relatively large overcurrent area which can improve the uniformity of the current density of the first electrode plate, reduce the internal resistance, and improve the overcurrent capability.

In some embodiments, in the radial direction of the first tab 11, a ratio of the size of the first welded portion W1 (i.e., the width of a ring of the annular first welded portion W1) to the outer radius of the first tab 11 is between 0.3 and 0.7.

As shown in FIG. 8, in some other embodiments, a plurality of first welded portions W1 are provided, and the plurality of first welded portions W1 are spaced in a circumferential direction of the columnar portion 31.

The first welded portion W1 may be a linear structure extending in the radial direction of the first tab 11, or may be a V-shaped structure, or of course, may have another structure.

The plurality of first welded portions W1 can increase the overcurrent area, improve the uniformity of the current density of the first electrode plate, reduce the internal resistance, and improve the overcurrent capability.

Figure 9:
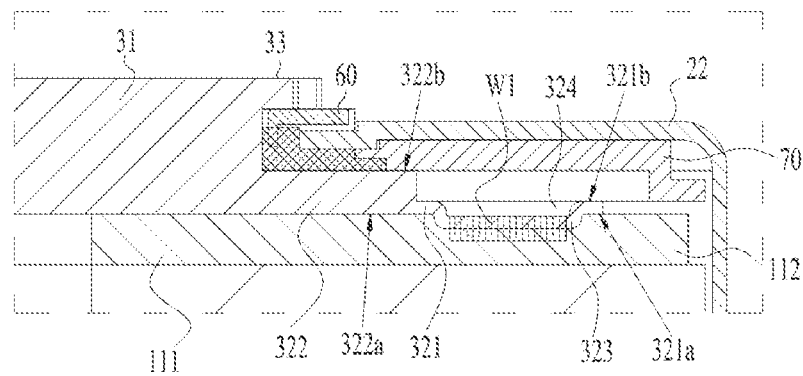
FIG. 9 is an enlarged schematic diagram of the battery cell shown in FIG. 6 at box B.
Figure 10:
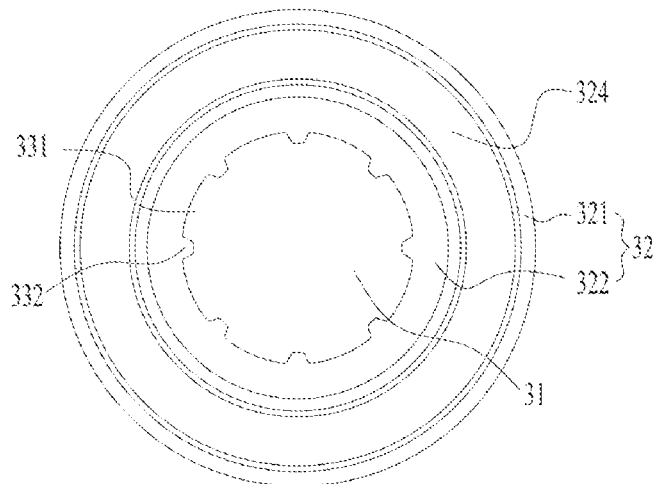
FIG. 10 is a schematic top view of an electrode terminal of a battery cell provided in some embodiments of the present application.

FIG. 9 is an enlarged schematic diagram of the battery cell shown in FIG. 6 at box B; FIG. 10 is a schematic top view of an electrode terminal of a battery cell provided in some embodiments of the present application.

Referring to FIGS. 6, 9 and 10, in some embodiments, the first connecting portion 32 comprises a first abutting portion 321 and a second abutting portion 322. The first abutting portion 321 abuts against and is welded to the first annular portion 112 so as to form the first welded portion W1, wherein a gap for avoiding the first welded portion W1 is formed between the first abutting portion 321 and the cover 22. The second abutting portion 322 is configured to connect the first abutting portion 321 to the columnar portion 31 and abuts against the cover 22.

The gap for avoiding the first welded portion W1 is located on a side of the first welded portion W1 which faces away from the first annular portion 112, and the gap enables a member (such as the cover 22) located on the side of the first welded portion W1 which faces away from the first annular portion 112 to be separated from the first welded portion W1.

In this embodiment, this gap may be formed by reducing the thickness of the first abutting portion 321, or this gap may be formed by providing a groove in the first abutting portion 321. Of course, the present application is not limited to the two ways, and other ways may be used to form the gap for avoiding the first welded portion W1.

The second abutting portion 322 can directly abut against the cover 22, or may indirectly abut against the cover 22 by other members. When the housing 20 and the electrode terminal 30 are assembled, the second abutting portion 322 may have a limiting function.

Optionally, the second abutting portion 322 is an annular structure surrounding the outside of the columnar portion 31.

A surface of the first abutting portion 321 facing the first annular portion 112 abuts against and is in contact with the first annular portion 112, such that currents can be transmitted through contact surfaces between the first abutting portion 321 and the first annular portion 112, so as to improve the overcurrent capability.

When the electrode terminal 30 and the electrode assembly 10 are assembled, the first abutting portion 321 of the electrode terminal 30 first abuts against the first tab 11, then a surface of the first abutting portion 321 which faces away from the first tab 11 is irradiated with laser light which welds the first abutting portion 321 to the first annular portion 112 to form the first welded portion W1.

A surface of the first welded portion W1 is uneven, and if the first welded portion W1 is in direct contact with other members, these members are prone to damage. In this embodiment, with the gap between the first abutting portion 321 and the cover 22 formed, the first welded portion W1 is allowed to avoid the cover 22 or other members between the first abutting portion 321 and the cover 22, thereby reducing the risk of the cover 22 and other members being crushed and improving the safety performance.

In some embodiments, a surface of the first abutting portion 321 facing the cover 22 is farther away from the cover 22 than the surface of the second abutting portion 322 facing the cover 22, so as to form a gap for avoiding the first welded portion W1.

The first abutting portion 321 has a first inner surface 321a and a first outer surface 321b which are oppositely arranged in the first direction X, the first outer surface 321b facing the cover 22. The second abutting portion 322 has a second inner surface 322a and a second outer surface 322b which are oppositely arranged in the first direction X, the second outer surface 322b facing the cover 22.

In the first direction X, the first outer surface 321b is farther away from the cover 22 than the second outer surface 322b. In this embodiment, relative positions of the first inner surface 321a and the second inner surface 322a are not limited. For example, the first inner surface 321a may be flush with the second inner surface 322a.

Optionally, the first abutting portion 321 has a generally flat plate structure, and the first inner surface 321a and the first outer surface 321b are both planar.

In some embodiments, the surface of the first abutting portion 321 facing the electrode assembly 10 is provided with a bump 323, and the bump 323 abuts against the first annular portion 112. The first abutting portion 321 is formed with a groove 324 in a region corresponding to the bump 323 on the surface facing away from the electrode assembly 10, and a portion between a top end face of the bump 323 and a bottom surface of the groove 324 is configured to be welded to the first annular portion 112 to form the first welded portion W1.

When the electrode terminal 30 is assembled to the electrode assembly 10, the bump 323 of the electrode terminal 30 first presses against the first annular portion 112, and then welding is performed. The bump 323 can be better attached to the first annular portion 112, reducing the risk of poor welding.

The bump 323 protrudes toward the first annular portion 112 relative to the first inner surface 321a. In some embodiments, the bump 323 may press the first annular portion 112 and be embedded in the first annular portion 112, and the first inner surface 321a presses against an end face of the first annular portion 112. In this way, part of the currents can also be transmitted through a mating portion between the first inner surface 321a and the end face of the first annular portion 112, thereby improving the overcurrent capability.

The groove 324 is recessed relative to the first outer surface 321b in a direction toward the first annular portion 112. In this embodiment, the provision of the groove 324 can reduce the thickness of the portion between the top end face of the bump 323 and the bottom surface of the groove 324 to reduce the power required for welding, reduce heat generation, and reduce the risk of the electrode assembly 10 being burned.

In this embodiment, the groove 324 is provided to form the gap for avoiding the first welded portion W1.

In some embodiments, a fixing piece (not shown) may be provided in the groove 324, and the fixing piece is configured to cover the first welded portion W1, so as to fix remaining metal particles on the first welded portion W1 and to reduce the risk of the metal particles falling into the electrode assembly 10 and causing a short circuit. The fixing piece may be an insulating patch or an insulating adhesive layer or be another structure.

In some embodiments, a surface of the second abutting portion 322 facing the electrode assembly 10 abuts against the first annular portion 112.

The second inner surface 322a of the second abutting portion 322 abuts against and is in contact with the first annular portion 112, and part of the currents can also be transmitted through a mating portion between the second inner surface 322a and the end face of the first annular portion 112, thereby improving the overcurrent capability.

In some embodiments, the first abutting portion 321 surrounds the outside of the second abutting portion 322, and the first abutting portion 321 has a thickness less than that of the second abutting portion 322.

The second abutting portion 322 is configured to abut against the cover 22, and requires a relatively large thickness, so as to reduce deformation of the second abutting portion 322 during assembly. The first abutting portion 321 is configured to be welded to the first annular portion 112, and may have a relatively small thickness, which can reduce the power required for welding, reduce heat generation, and reduce the risk of the electrode assembly 10 being burned.

In some embodiments, the first tab 11 further comprises a second annular portion 111, the first annular portion 112 surrounds the outside of the second annular portion 111, the second annular portion 111 is arranged opposite to the electrode lead-out hole 221 in the first direction X, and the second annular portion 111 at least partially abuts against the columnar portion 31.

The second annular portion 111 being arranged opposite to the electrode lead-out hole 221 in the first direction X means that a projection of the second annular portion 111 in the first direction X is located within the projection of the electrode lead-out hole 221 in the first direction X, and the contour of the projection of the second annular portion 111 in the first direction X coincides with the contour of the projection of the electrode lead-out hole 221 in the first direction X. For example, the second annular portion 111 is arranged around the central axis A.

The first annular portion 112 is connected to the second annular portion 111, and the first annular portion 112 is an annular structure surrounding the outside of the second annular portion 111. The contour of the projection of the electrode lead-out hole 221 on the first tab 11 in the first direction X may be considered as coinciding with the contour of a boundary between the second annular portion 111 and the first annular portion 112.

the second annular portion 111 at least partially abuts against the columnar portion 31, such that part of the currents may be transmitted to the electrode terminal 30 through an abutment between the second annular portion 111 and the columnar portion 31.

In this embodiment, the provision of the second annular portion 111 can improve the overcurrent capability. The second annular portion 111 can also support the first annular portion 112 in the radial direction to reduce the risk of crushing deformation of the first annular portion 112 and improve the stability of welding of the first annular portion 112 and the first connecting portion 32 when the first annular portion 112 is welded to the first connecting portion 32.

In some embodiments, the columnar portion 31 is welded to the second annular portion 111 to form a second welded portion. The second welded portion can reduce contact resistance between the columnar portion 31 and the second annular portion 111 and improve the overcurrent capability.

In some embodiments, a surface of the columnar portion 31 facing the electrode assembly 10 is flush with a surface of the first connecting portion 32 facing the electrode assembly 10.

In this solution, both the surface of the columnar portion 31 facing the electrode assembly 10 and the surface of the first connecting portion 32 facing the electrode assembly 10 can abut against the first tab 11, so as to increase a contact area between the first tab 11 and the electrode terminal 30 and improve the overcurrent capability.

In some embodiments, the electrode terminal 30 further comprises a limiting portion 33, the limiting portion 33 is connected to and protrudes from a lateral wall of the columnar portion 31, the limiting portion 33 is located on a side of the cover 22 which faces away from the first connecting portion 32, and the first connecting portion 32 and the limiting portion 33 are configured to clamp a part of the cover 22 in the first direction X.

In the first direction X, The limiting portion 33 at least partially overlaps with the cover 22, and the first connecting portion 32 at least partially overlaps with the cover 22. The columnar portion 31 passes through the electrode lead-out hole 221 to connect the limiting portion 33 and the first connecting portion 32 which are respectively located on two sides of the cover 22.

The limiting portion 33 and the first connecting portion 32 clamp a part of the cover 22 from two sides to fix the electrode terminal 30 to the cover 22. The limiting portion 33 and the first connecting portion 32 can directly clamp the cover 22, or may indirectly clamp the cover 22 by other members.

Optionally, the columnar portion 31 is cylindrical, and the limiting portion 33 and the first connecting portion 32 each are annular.

In some embodiments, the columnar portion 31, the limiting portion 33, and the first connecting portion 32 are of an integrally formed structure.

In some embodiments, the limiting portion 33 overlaps with the second abutting portion 322 in the first direction X, such that the limiting portion 33 and the second abutting portion 322 are configured to clamp a part of the cover 22 in the first direction X to fix the electrode terminal 30 to the cover 22. For example, in order to ensure the connection strength between the electrode terminal 30 and the cover 22 and reduce deformation of the second abutting portion 322, the second abutting portion 322 may have a greater thickness than the first abutting portion 321.

In some embodiments, the battery cell 7 further comprises a first insulating member 60 and a second insulating member 70, at least a part of the first insulating member 60 is clamped between the limiting portion 33 and the cover 22, and the second insulating member 70 is at least partially clamped between the first connecting portion 32 and the cover 22. The first insulating member 60 and the second insulating member 70 are configured to insulate and isolate the electrode terminal 30 from the cover 22.

The first insulating member 60 and the second insulating member 70 each are an annular structure arranged around the columnar portion 31.

The first insulating member 60 can insulate and isolate the limiting portion 33 from the cover 22, and the second insulating member 70 can insulate and isolate the first connecting portion 32 from the cover 22.

In some embodiments, one of the first insulating member 60 and the second insulating member 70 separates the columnar portion 31 from the cover 22. For example, a part of the first insulating member 60 extends into the electrode lead-out hole 221 to separate a hole wall of the electrode lead-out hole 221 from the columnar portion 31.

In some embodiments, the second insulating member 70 is at least partially clamped between the cover 22 and the second abutting portion 322. That is to say, the second abutting portion 322 abuts against the cover 22 by means of the second insulating member 70.

The second abutting portion 322 can be configured to support and fix the second insulating member 70 and separate the second insulating member 70 from the first welded portion W1 to prevent the first welded portion W1 from crushing the second insulating member 70. Optionally, the first abutting portion 321 is spaced apart from the second insulating member 70.

In some embodiments, the first insulating member 60 and the second insulating member 70 are of an integrally formed structure. Alternatively, in some other embodiments, the first insulating member 60 and the second insulating member 70 are provided separately and abut against each other.

In some embodiments, one of the first insulating member 60 and the second insulating member 70 is configured to seal the electrode lead-out hole 221. In some examples, the limiting portion 33 and the cover 22 squeeze the first insulating member 60, and the first insulating member 60 is compressed and seals the electrode lead-out hole 221 from the outside. In some other examples, the first connecting portion 32 and the cover 22 squeeze the second insulating member 70, and the second insulating member 70 is compressed and seals the electrode lead-out hole 221 from the inside.

In some embodiments, the battery cell 7 further comprises a seal ring 80, and the seal ring 80 is sleeved on the columnar portion 31 and is configured to seal the electrode lead-out hole 221. Optionally, a part of the seal ring 80 extends into the electrode lead-out hole 221 to separate the hole wall of the electrode lead-out hole 221 from the columnar portion 31.

In some embodiments, a periphery of the limiting portion 33 is provided with a plurality of protruding structures 331, and the plurality of protruding structures 331 are spaced in a circumferential direction of the columnar portion 31.

Optionally, the plurality of protruding structures 331 may be equally spaced in the circumferential direction of the columnar portion 31.

The limiting portion 33 has an edge-folded structure formed by outwardly folding over an end portion of the columnar portion 31 which faces away from the electrode assembly 10.

Before the electrode terminal 30 is assembled to the housing 20, the limiting portion 33 of the electrode terminal 30 has a generally cylindrical structure and is located at an upper end of the columnar portion 31, and a lateral wall of the limiting portion 33 is flush with the lateral wall of the columnar portion 31. When the electrode terminal 30 is assembled to the housing 20, after the limiting portion 33 passes through the electrode lead-out hole 221, the limiting portion 33 is squeezed, such that the limiting portion 33 is folded over outwardly, and the electrode terminal 30 is riveted to the cover 22.

Before the limiting portion 33 is folded over, a plurality of spaced groove structures 332 are formed at an upper end of the limiting portion 33; after first limiting portion 33 is folded over, a plurality of protruding structures 331 spaced in the circumferential direction of the columnar portion 31 are formed, and the groove structures 332 are provided between adjacent protruding structures 331. In this embodiment, the provision of the groove structures 332 and the protruding structures 331 reduces the difficulty in folding over the limiting portion 33 and reduces stress concentration on the limiting portion 33.

Figure 11:
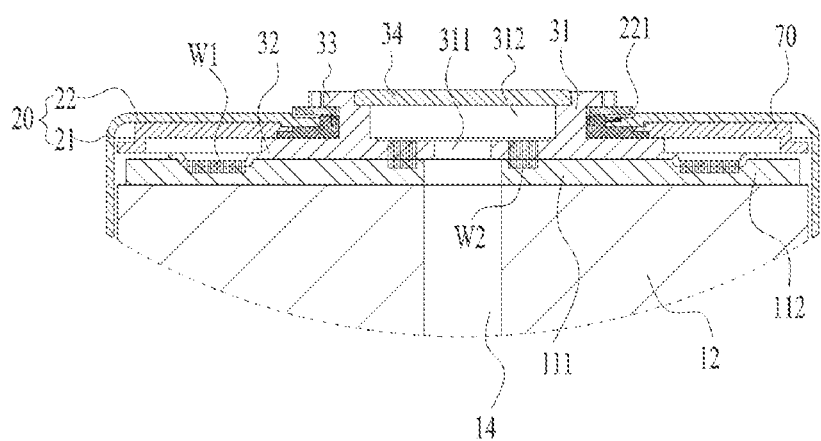
FIG. 11 is a partial schematic cross-sectional view of a battery cell provided in some other embodiments of the present application.
Figure 12:
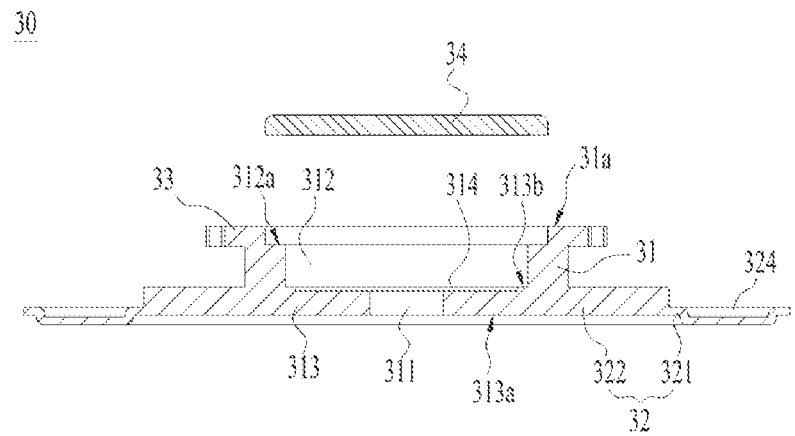
FIG. 12 is a schematic structural diagram of the electrode terminal shown in FIG. 11.

FIG. 11 is a partial schematic cross-sectional view of a battery cell provided in some other embodiments of the present application; and FIG. 12 is a schematic structural diagram of the electrode terminal shown in FIG. 11.

As shown in FIGS. 11 and 12, in some embodiments, the columnar portion 31 is provided with a first through hole 311, and the first through hole 311 communicates an interior space of the housing 20 with a space outside the housing 20. The electrode terminal 30 further comprises a sealing plate 34, and the sealing plate 34 is connected to the columnar portion 31 and is configured to seal the first through hole 311.

The first through hole 311 runs through the columnar portion 31 in the first direction. One or more first through holes 311 may be provided.

During forming of the battery cell 7, the first through hole 311 may be used in a plurality of forming procedures. For example, the first through hole 311 may be used in a liquid injection procedure, a formation procedure or other procedures.

The sealing plate 34 can function to seal the first through hole 311. After the battery cell 7 is formed, the sealing plate 34 may reduce the risk of electrolyte leakage through the first through hole 311 and improve the sealing performance.

Specifically, the first through hole 311 is used for injecting an electrolyte into the interior space of the housing 20. When liquid injection is required, a liquid injection head of a liquid injection device presses against the columnar portion 31, and then the liquid injection head injects the electrolyte into the housing 20 through the first through hole 311.

During forming of the battery cell 7, a gas is generated in the housing 20, and the first through hole 311 may also be used to communicate with an external negative pressure device, so as to pump out the gas in the housing 20.

In some embodiments, an axis of the first through hole 311 coincides with the axis of the electrode lead-out hole 221.

In some embodiments, the columnar portion 31 is provided with a first recess 312, and the first recess 312 is recessed, in a direction toward the electrode assembly 10, from a surface of the columnar portion 31 which faces away from the electrode assembly 10. The columnar portion 31 forms a second connecting portion 313 at the bottom of the first recess 312, and the first through hole 311 runs through the second connecting portion 313 to communicate the first recess 312 with the interior space of the housing 20. The sealing plate 34 is at least partially accommodated in the first recess 312 and closes an opening of the first recess 312.

In this embodiment, the at least a part of the sealing plate 34 is accommodated in the first recess 312, which can reduce an overall size of the electrode terminal 30 in the first direction, reduce a space occupied by the electrode terminal 30, and increase energy density. When the sealing plate 34 is assembled, the first recess 312 may also position the sealing plate 34, thereby simplifying an assembly process.

In some embodiments, the sealing plate 34 is welded to the side wall of the first recess 312, so as to close the opening of the first recess 312.

In some embodiments, the first tab 11 further comprises a second annular portion 111, the first annular portion 112 surrounds the outside of the second annular portion 111, the second annular portion 111 is arranged opposite to the electrode lead-out hole 221 in the first direction X, and the second annular portion 111 at least partially abuts against the second connecting portion 313. The second connecting portion 313 is welded to the second annular portion 111 to form a second welded portion W2.

A projection of the second connecting portion 313 in the first direction X is located within the projection of the electrode lead-out hole 221 in the first direction X.

The second welded portion W2 can reduce contact resistance between the second connecting portion 313 and the second annular portion 111 and improve the overcurrent capability. In this embodiment, the provision of the first recess 312 reduces the thickness of the second connecting portion 313, which can reduce the welding power required for welding the second connecting portion 313 to the second annular portion 111, reduce heat generation, and reduce the risk of other members (e.g., the first insulating member and the second insulating member) being burned.

During welding, the second connecting portion 313 is subject to welding stresses. The first through hole 311 in this embodiment can function to release stresses, thereby reducing the risk of deformation and cracking of the second connecting portion 313 during welding, and ensuring the connection strength between the second connecting portion 313 and the second annular portion 111.

In some embodiments, the second connecting portion 313 has a thickness of 0.5-10 mm.

In some embodiments, the second connecting portion 313 comprises a second recess 314, a bottom wall of the second recess 314 is formed with the second welded portion W2, and the second recess 314 is configured to be recessed from an outer surface 313b of the second connecting portion in a direction toward the electrode assembly, such that a gap is formed between the outer surface 313b of the second connecting portion and the bottom wall of the second recess 314.

In this embodiment, the second recess 314 is provided in the second connecting portion 313, so as to form a stepped structure on the second connecting portion 313.

A portion between the bottom wall of the second recess 314 and an inner surface 313a of the second connecting portion is configured for welding to the second annular portion 111 to form the second welded portion W2. The first through hole 311 extends from the bottom wall of the second recess 314 to the inner surface 313a of the second connecting portion to run through the second connecting portion 313.

During producing the battery cell 7, an external device needs to cooperate with the second connecting portion 313. Since a surface of the second welded portion W2 is uneven, if the external device presses against the second welded portion W2, the external device is prone to being crushed by the second welded portion W2. In this embodiment, the second recess 314 is provided to form the gap between the outer surface 313b of the second connecting portion and the bottom wall of the second recess 314. In this way, the outer surface 313b of the second connecting portion may be used to support the external device, so as to separate the external device from the second welded portion W2, and reduce the risk of the external device being crushed.

The external device may be a liquid injection device, a gas extraction device, a welding device or a device for battery cells 7.

For example, during liquid injection, the liquid injection head presses against the outer surface 313b of the second connecting portion, and the outer surface 313b of the second connecting portion may support the liquid injection head, and fit with the liquid injection head to implement sealing therebetween, so as to reduce the risk of leakage of the electrolyte to the outside of the battery cell 7.

In some embodiments, a gap for avoiding the second welded portion W2 is provided between the sealing plate 34 and the second connecting portion 313.

The second welded portion W2 has an uneven surface, and if the sealing plate 34 presses against the second welded portion W2, the sealing plate 34 will wobble during assembly, which affects the sealing effect. In this embodiment, the gap is provided between the sealing plate 34 and the second connecting portion 313 to enable the sealing plate 34 to avoid the second welded portion W2 and prevent the sealing plate 34 from being in direct contact with the second welded portion W2, thereby reducing wobbles of the sealing plate 34 during assembly and ensuring the sealing effect.

In some other embodiments, the sealing plate 34 may abut against the second connecting portion 313, and the second recess 314 in the second connecting portion 313 forms a gap between the sealing plate 34 and the second connecting portion 313.

In some other embodiments, a stepped surface 312a is provided on a side wall of the first recess 312, and the stepped surface 312a is used to support the sealing plate 34.

The first recess 312 is a stepped recess that has a larger top than the bottom.

When the sealing plate 34 is assembled, the stepped surface 312a can support the sealing plate 34 and position the sealing plate 34, thereby simplifying an assembly process. The first recess 312 has a stepped structure, such that the sealing plate 34 abuts against the stepped surface 312a to form a gap between the sealing plate 34 and the second connecting portion 313.

In some embodiments, the electrode assembly 10 is of a wound structure, the electrode assembly 10 is provided with a second through hole 14 at a winding center, the second through hole 14 runs through the electrode assembly 10 in the first direction, and the second through hole 14 is arranged opposite to the first through hole 311 in the first direction such that the electrolyte is capable of flowing to the interior of the electrode assembly 10 through the second through hole 14.

The electrode assembly is formed by winding the first electrode plate, the second electrode plate and the separator around a winding tool, and after the forming by winding, the winding tool is extracted from the electrode assembly. After the winding tool is extracted, the second through hole 14 is formed in the middle of the electrode assembly.

An axis of the second through hole 14 coincides with the central axis of the electrode assembly. The second through hole 14 runs through the first tab 11, the main body portion 12 and the second tab 13 in the first direction. The second annular portion 111 of the first tab 11 is an annular structure surrounding the outside of the second through hole 14, and the first annular portion 112 is an annular structure surrounding the outside of the second annular portion 111.

In the liquid injection procedure, the electrolyte can flow into the second through hole 14 through the first through hole 311, and the electrolyte flowing into the second through hole 14 can infiltrate the electrode assembly from the inside, thereby improving the efficiency of infiltrating the electrode assembly.

In some embodiments, the projection of the first through hole 311 in the first direction X is located within the projection of the second through hole 14 in the first direction X. In this way, the blocking of the first through hole 311 by the first tab 11 can be reduced, and the electrolyte can smoothly flow into the second through hole 14.

In some embodiments, the first through hole 311 and the second through hole 14 are coaxially arranged. The second through hole 14 may have an aperture greater than or equal to that of the first through hole 311.

Figure 13:
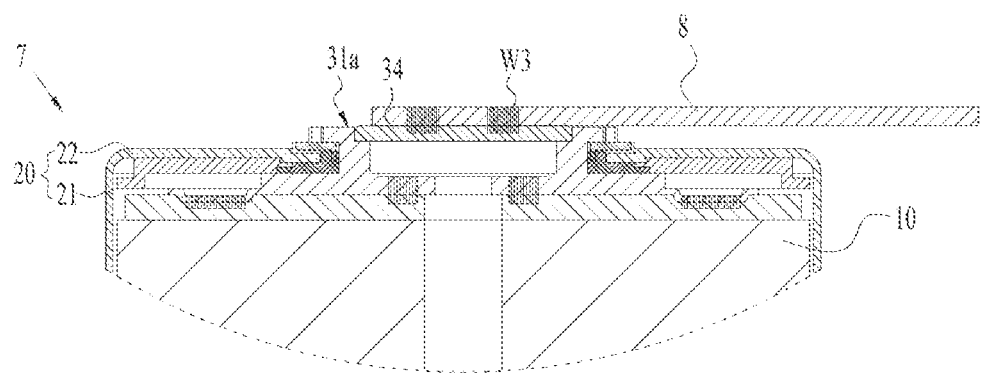
FIG. 13 is a schematic structural diagram of a battery cell provided in some embodiments of the present application which is connected to a busbar component.

FIG. 13 is a schematic structural diagram of a battery cell provided in some embodiments of the present application which is connected to a busbar component.

As shown in FIG. 13, in some embodiments, the sealing plate 34 is configured to be welded to a busbar component 8 of a battery to form a third welded portion W3.

In the battery, the battery cells 7 are electrically connected by means of the busbar component 8. The third welded portion W3 can reduce contact resistance between the sealing plate 34 and the busbar component 8 and improve the overcurrent capability.

Optionally, in the battery, the busbar component 8 connects a sealing plate 34 of one of the battery cells 7 to a cover of another of the battery cells to connect the two battery cells in series.

In some embodiments, the sealing plate 34 at least partially protrudes from an outer surface 31*a* of the columnar portion.

When the busbar component 8 needs to be welded to the sealing plate 34, the busbar component 8 is first attached to an upper surface of the sealing plate 34 (i.e., an outer surface of the sealing plate 34 which face away from the second connecting portion), and then the busbar component 8 is welded to the sealing plate 34.

The sealing plate 34 at least partially protrudes from the outer surface 31*a* of the columnar portion to prevent the outer surface 31*a* of the columnar portion from interfering with the attachment between the sealing plate 34 and the busbar component 8 and to ensure that the busbar component 8 is closely connected to the sealing plate 34.

Figure 14:
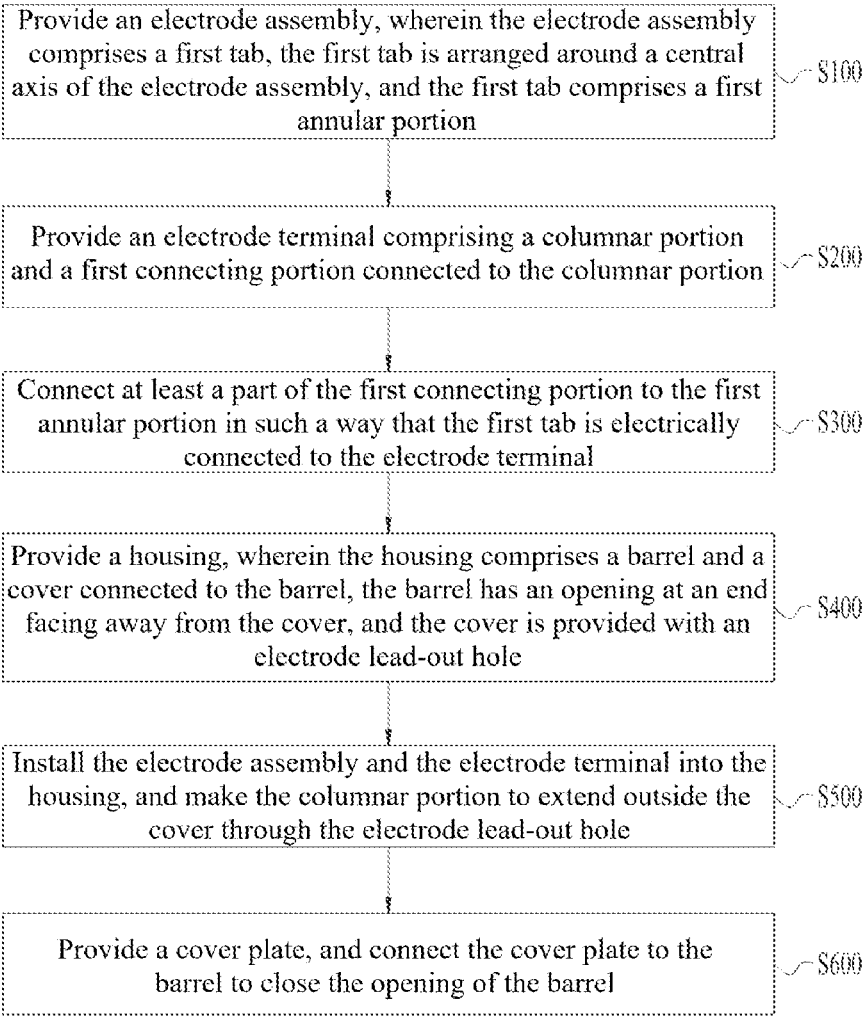
FIG. 14 is a schematic flowchart of a method for manufacturing a battery cell provided in some embodiments of the present application.

FIG. 14 is a schematic flowchart of a method for manufacturing a battery cell provided in some embodiments of the present application.

As shown in FIG. 14, the method for manufacturing a battery cell according to this embodiment of the present application comprises the following steps.

At step S100, an electrode assembly is provided, wherein the electrode assembly comprises a first tab, the first tab is arranged around a central axis of the electrode assembly, and the first tab comprises a first annular portion.

At step S200, an electrode terminal comprising a columnar portion and a first connecting portion connected to the columnar portion is provided.

At step S300, the first connecting portion is at least partially connected to the first annular portion in such a way that the first tab is electrically connected to the electrode terminal.

At step S400, a housing is provided, wherein the housing comprises a barrel and a cover connected to the barrel, the barrel has an opening at an end facing away from the cover, and the cover is provided with an electrode lead-out hole.

At step S500, the electrode assembly and the electrode terminal are installed into the housing, and the columnar portion extends outside the cover through the electrode lead-out hole.

At step S600, a cover plate is provided, and the cover plate is connected to the barrel to close the opening of the barrel.

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the first connecting portion is at least partially located between the cover and the first annular portion and is connected to the first annular portion.

In some embodiments, the method for manufacturing a battery cell further comprises step S510 in which an end portion of the columnar portion which faces away from the electrode assembly is squeezed to force the end portion to extend outwardly to form a limiting structure for fixing the electrode terminal to the cover.

In this embodiment, the limiting structure and the first connecting portion can clamp a part of the cover from two sides to fix the electrode terminal to the cover.

Optionally, step S510 may be performed after step S500 and before step S600.

In some other embodiments, the method for manufacturing a battery cell further comprises step S520 in which the end portion of the columnar portion which faces away from the electrode assembly is outwardly folding over to form an edge-folded structure, so as to fix the electrode terminal to the cover.

In this embodiment, the edge-folded structure and the first connecting portion can clamp a part of the cover from two sides to fix the electrode terminal to the cover.

Optionally, step S520 may be performed after step S500 and before step S600.

It should be noted that for a related structure of the battery cell manufactured by the foregoing method for manufacturing a battery cell, reference may be made to the battery cells provided in the foregoing embodiments.

When a battery cell is assembled based on the foregoing method for manufacturing a battery cell, it is not necessary to sequentially perform the foregoing steps, that is to say, the steps may be performed in the order mentioned in the embodiments, or the steps may be performed in an different order from the order mentioned in the embodiments, or several steps are performed simultaneously. For example, steps S100 and S200 may be performed in a random order, or may be performed simultaneously.

Figure 15:
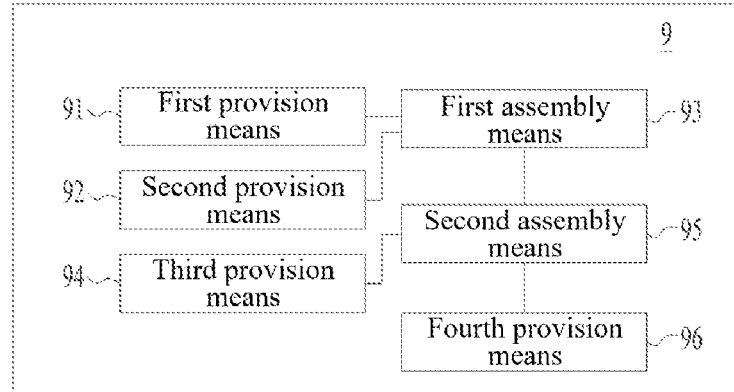
FIG. 15 is a schematic block diagram of a system for manufacturing a battery cell provided in some embodiments of the present application.

FIG. 15 is a schematic block diagram of a system for manufacturing a battery cell provided in some embodiments of the present application.

As shown in FIG. 15, the system 9 for manufacturing a battery cell according to this embodiment of the present application comprises:

a first provision means 91 configured to provide an electrode assembly, wherein the electrode assembly comprises a first tab, the first tab is arranged around a central axis of the electrode assembly, and the first tab comprises a first annular portion;

a second provision means 92 configured to provide an electrode terminal comprising a columnar portion and a first connecting portion connected to the columnar portion;

a first assembly means 93 configured to connect at least a part of the first connecting portion to the first annular portion in such a way that the first tab is electrically connected to the electrode terminal;

a third provision means 94 configured to provide a housing, wherein the housing comprises a barrel and a cover connected to the barrel, the barrel has an opening at an end facing away from the cover, and the cover is provided with an electrode lead-out hole;

a second assembly means 95 configured to install the electrode assembly and the electrode terminal into the housing and make the columnar portion extend outside the cover through the electrode lead-out hole; and a fourth provision means 96 configured to provide a cover plate and connect the cover plate to the barrel to close the opening of the barrel;

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the first connecting portion is at least partially located between the cover and the first annular portion and is connected to the first annular portion.

For a related structure of the battery cell manufactured by the foregoing manufacturing system 9, reference may be made to the battery cells provided in the foregoing embodiments.

It should be noted that the embodiments in the present application and features in the embodiments may be combined with each other without conflicts.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some of the technical features therein may be equivalently substituted, but these modifications or substitutions do not make the essence of corresponding technical solutions depart from the spirit and scope of the technical solutions of the embodiments of the present application.

The invention claimed is:

1. A battery cell, comprising:
   an electrode assembly comprising a first tab arranged around a central axis of the electrode assembly;
   a housing configured to accommodate the electrode assembly, wherein the housing comprises a barrel and a cover connected to the barrel, the barrel is arranged around a periphery of the electrode assembly, the cover is provided with an electrode lead-out hole, the central axis extends in a first direction and passes through the electrode lead-out hole, the first tab comprises a first annular portion, the first annular portion is arranged opposite to the cover, and a projection of the first annular portion in the first direction does not overlap with a projection of the electrode lead-out hole in the first direction; and
   an electrode terminal comprising a columnar portion and a first connecting portion connected to the columnar portion, wherein the columnar portion is at least partially located in the electrode lead-out hole, and the first connecting portion is at least partially located between the cover and the first annular portion and is configured to connect the first annular portion in such a way that the first tab is electrically connected to the electrode terminal,
   wherein the first connecting portion is an annular structure surrounding an outside of the columnar portion and comprises a first abutting portion and a second abutting portion,
   the first abutting portion is abutting against and welded to the first annular portion to form a first welded portion, wherein a gap for avoiding the first welded portion is formed between the first abutting portion and the cover,
   the second abutting portion is configured to connect the first abutting portion to the columnar portion and abutting against the cover.

2. The battery cell according to claim 1, wherein the first welded portion is annular and is arranged around the columnar portion; or a plurality of first welded portions are provided, and the plurality of first welded portions are spaced in a circumferential direction of the columnar portion.

3. The battery cell according to claim 1, wherein a surface of the first abutting portion facing the cover is farther away from the cover than a surface of the second abutting portion facing the cover, so as to form a gap for avoiding the first welded portion.

4. The battery cell according to claim 1, wherein a surface of the first abutting portion facing the electrode assembly is provided with a bump, and the bump abuts against the first annular portion; and the first abutting portion is formed with a groove in a region corresponding to the bump on a surface facing away from the electrode assembly, and a portion between a top end face of the bump and a bottom surface of the groove is configured to be welded to the first annular portion to form the first welded portion.

5. The battery cell according to claim 1, wherein a surface of the second abutting portion facing the electrode assembly abuts against the first annular portion.

6. The battery cell according to claim 1, wherein the first abutting portion surrounds an outside of the second abutting portion, and the first abutting portion has a thickness less than that of the second abutting portion.

7. The battery cell according to claim 1, wherein the first tab further comprises a second annular portion, the first annular portion surrounds an outside of the second annular portion, the second annular portion is arranged opposite to the electrode lead-out hole in the first direction, and the second annular portion at least partially abuts against the columnar portion.

8. The battery cell according to claim 7, wherein the columnar portion is welded to the second annular portion to form a second welded portion.

9. The battery cell according to claim 7, wherein a surface of the columnar portion facing the electrode assembly is flush with a surface of the first connecting portion facing the electrode assembly.

10. The battery cell according to claim 1, wherein the central axis coincides with an axis of the electrode lead-out hole.

11. The battery cell according to claim 1, wherein the electrode terminal further comprises a limiting portion connected to and protruding from a lateral wall of the columnar portion, the limiting portion is located on a side of the cover which faces away from the first connecting portion, and the first connecting portion and the limiting portion are configured to clamp a part of the cover in the first direction.

12. The battery cell according to claim 11, wherein the battery cell further comprises a first insulating member and a second insulating member, the first insulating member is at least partially clamped between the limiting portion and the cover, and the second insulating member is at least partially clamped between the first connecting portion and the cover; and
   the first insulating member and the second insulating member are configured to insulate and isolate the electrode terminal from the cover.

13. The battery cell according to claim 12, wherein the first insulating member and the second insulating member are of an integrally formed structure; or
   the first insulating member and the second insulating member are provided separately and abut against each other.

14. The battery cell according to claim 12, wherein one of the first insulating member and the second insulating member is configured to seal the electrode lead-out hole.

15. The battery cell according to claim 11, wherein a periphery of the limiting portion is provided with a plurality of protruding structures which are spaced in a circumferential direction of the columnar portion.

16. The battery cell according to claim 1, wherein the columnar portion is provided with a first through hole, and the first through hole communicates an interior space of the housing with a space outside the housing; and
   the electrode terminal further comprises a sealing plate which is connected to the columnar portion and which is configured to seal the first through hole.

17. The battery cell according to claim 1, wherein the columnar portion and the first connecting portion are of an integrally formed structure.

18. A method for manufacturing a battery cell, the method comprising:
   providing an electrode assembly, wherein the electrode assembly comprises a first tab, the first tab is arranged around a central axis of the electrode assembly, and the first tab comprises a first annular portion;
   providing an electrode terminal comprising a columnar portion and a first connecting portion connected to the columnar portion, the first connecting portion comprises a first abutting portion abutting and a second abutting portion,
   connecting at least a part of the first connecting portion to the first annular portion in such a way that the first abutting portion is abutting against and welded to the first annular portion to form a first welded portion and the first tab is electrically connected to the electrode terminal;
   providing a housing, wherein the housing comprises a barrel and a cover connected to the barrel, the barrel has an opening at an end facing away from the cover, and the cover is provided with an electrode lead-out hole;
   installing the electrode assembly and the electrode terminal into the housing, and making the columnar portion to extend outside the cover through the electrode lead-out hole; and
   providing a cover plate and connecting the cover plate to the barrel to close the opening of the barrel;
   wherein the barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the first connecting portion is at least partially located between the cover and the first annular portion and is connected to the first annular portion, a gap for avoiding the first welded portion is formed between the first abutting portion and the cover, the second abutting portion connects the first abutting portion to the columnar portion and abutting against the cover.

* * * * *